United States Patent [19]

Green

[11] Patent Number: 5,250,007

[45] Date of Patent: Oct. 5, 1993

[54] METHOD AND APPARATUS FOR FORMING THREADS WITH VARIABLE PITCH

[76] Inventor: William P. Green, 3570 E. Lombardy Rd., Pasadena, Calif. 91107

[21] Appl. No.: 942,634

[22] Filed: Sep. 9, 1992

Related U.S. Application Data

[63] Continuation-in-part of Ser. No. 783,429, Oct. 28, 1991, abandoned.

[51] Int. Cl.$^5$ .............................................. B21D 53/24
[52] U.S. Cl. ........................................ 470/11; 470/96; 470/66; 470/198; 470/10; 408/215; 408/138; 409/65; 409/70
[58] Field of Search ................. 470/96, 11, 87, 10, 470/106, 18, 25, 200, 201, 202, 203, 66, 70, 71, 73, 76, 199, 198; 408/215, 217, 222, 137, 138, 158; 409/65, 66, 67, 70, 74

[56] References Cited

U.S. PATENT DOCUMENTS

| | | | |
|---|---|---|---|
| 1,643,263 | 9/1927 | Wetmore | 470/200 |
| 2,100,724 | 11/1937 | Slotta | 408/215 |
| 2,212,753 | 8/1940 | Smith et al. | 408/217 |
| 2,314,138 | 3/1943 | Garbe et al. | 470/96 |
| 2,545,443 | 3/1951 | Bowren | 408/158 |
| 2,546,066 | 3/1951 | Gleasman et al. | 470/200 |
| 2,819,621 | 1/1958 | Wood, Jr. et al. | 409/65 |
| 3,058,129 | 10/1962 | Sullivan | 408/137 |
| 3,526,167 | 9/1970 | Escubedo | 409/74 |
| 3,557,657 | 1/1971 | Swanson | 409/67 |
| 3,621,754 | 11/1971 | Ditson | 409/74 |
| 3,803,927 | 4/1974 | Lawler | 408/137 |
| 4,090,808 | 5/1978 | Nannen | 408/200 |
| 4,743,146 | 5/1988 | Khmelnitsky et al. | 470/188 |
| 4,842,464 | 7/1989 | Green | 411/307 |
| 4,934,040 | 6/1990 | Turchan | 409/74 |

FOREIGN PATENT DOCUMENTS

3196915  8/1991  Japan ..................... 409/65

OTHER PUBLICATIONS

The Book "Practical Machine Shop" by John E. Neely pp. 83 to 90 and 415 to 417.
"Machine Tools Processes and Applications" by Heineman and Genevro, pp. 42 to 46 and 210 to 212.
"Machine Shop Operations and Setups" by Lascoe, Nelson & Porter, pp. 64 through 69.

Primary Examiner—Lowell A. Larson
Assistant Examiner—Michael J. McKeon
Attorney, Agent, or Firm—William P. Green

[57] ABSTRACT

Apparatus and methods for forming a thread of varying pitch by utilizing a threading assembly which includes a plurality of threading elements having thread cutting or forming portions on the different elements for engaging the work piece at different locations, with the assembly and work piece being driven both rotatively and at the same time axially relative to one another to form the thread. The rate of axial advancement per revolution between the work piece and each of the threading elements is varied, and the elements of the assembly are also shifted axially relative to one another during the rotary and axial movement, to give the thread its varying pitch.

61 Claims, 7 Drawing Sheets

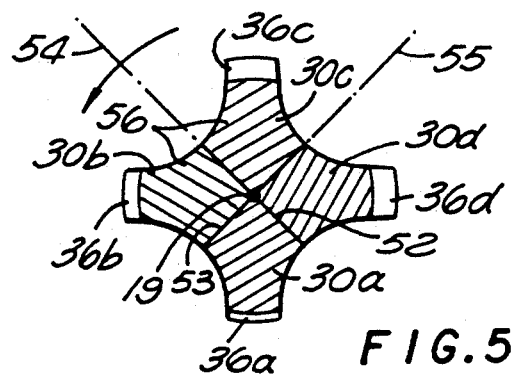
FIG. 2
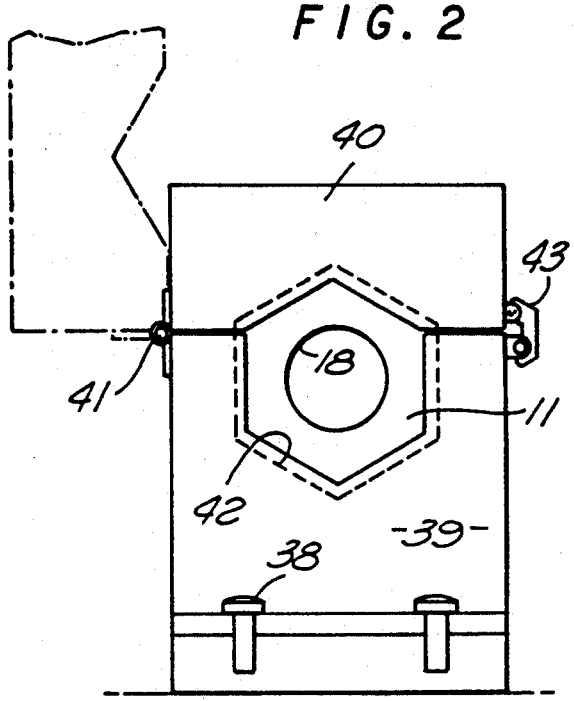
FIG. 5
FIG. 6
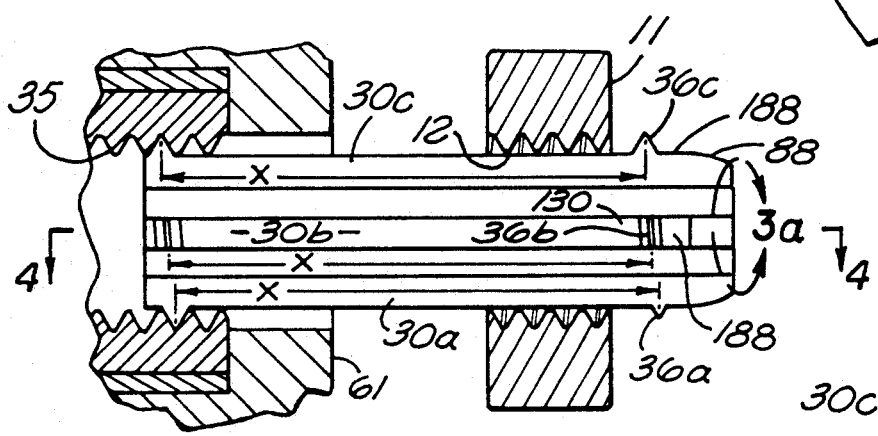
FIG. 3
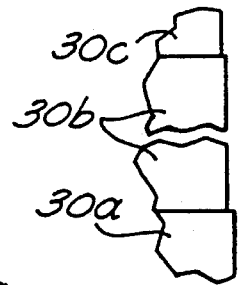
FIG. 3a
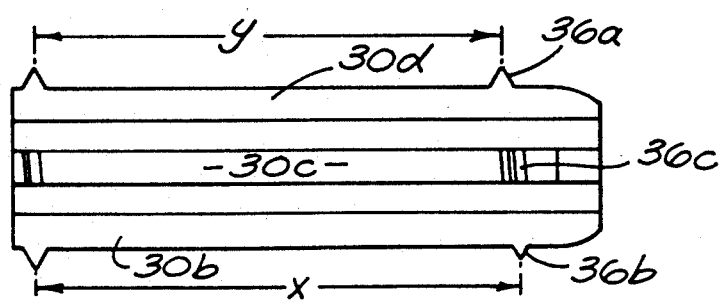
FIG. 4

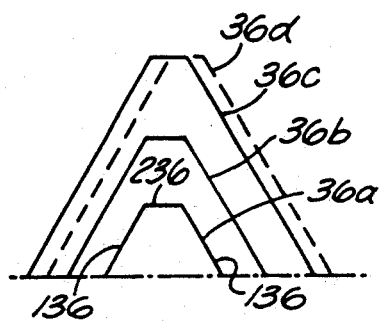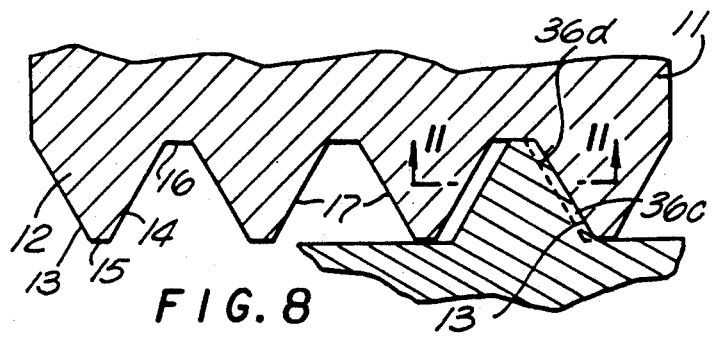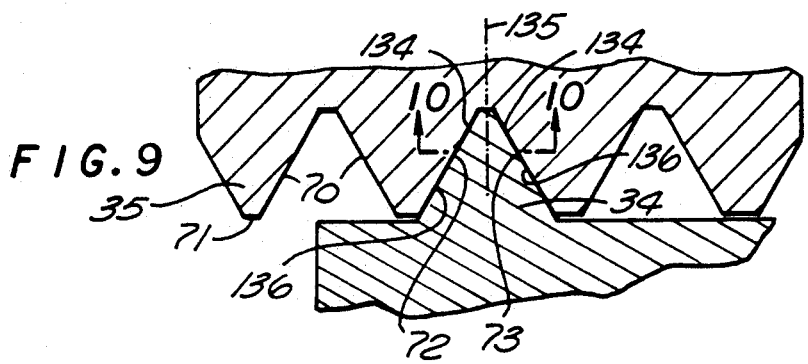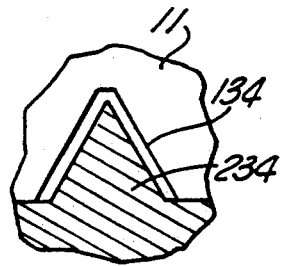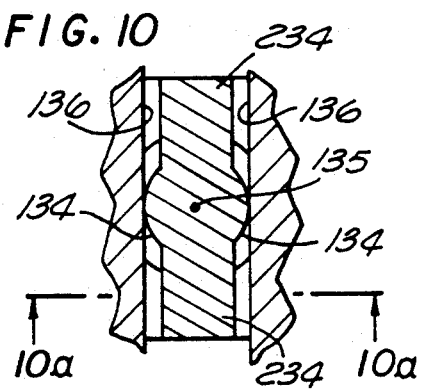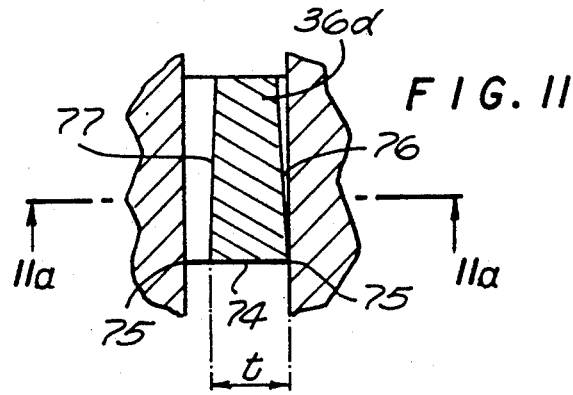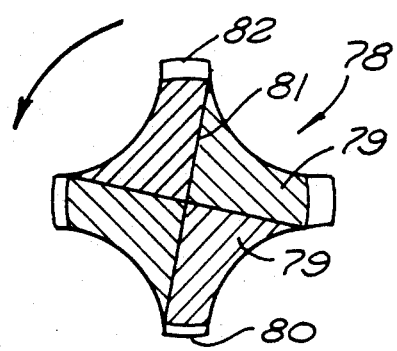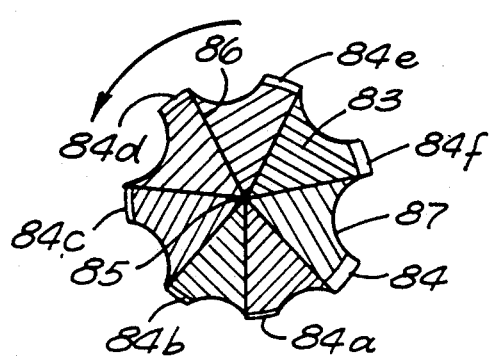

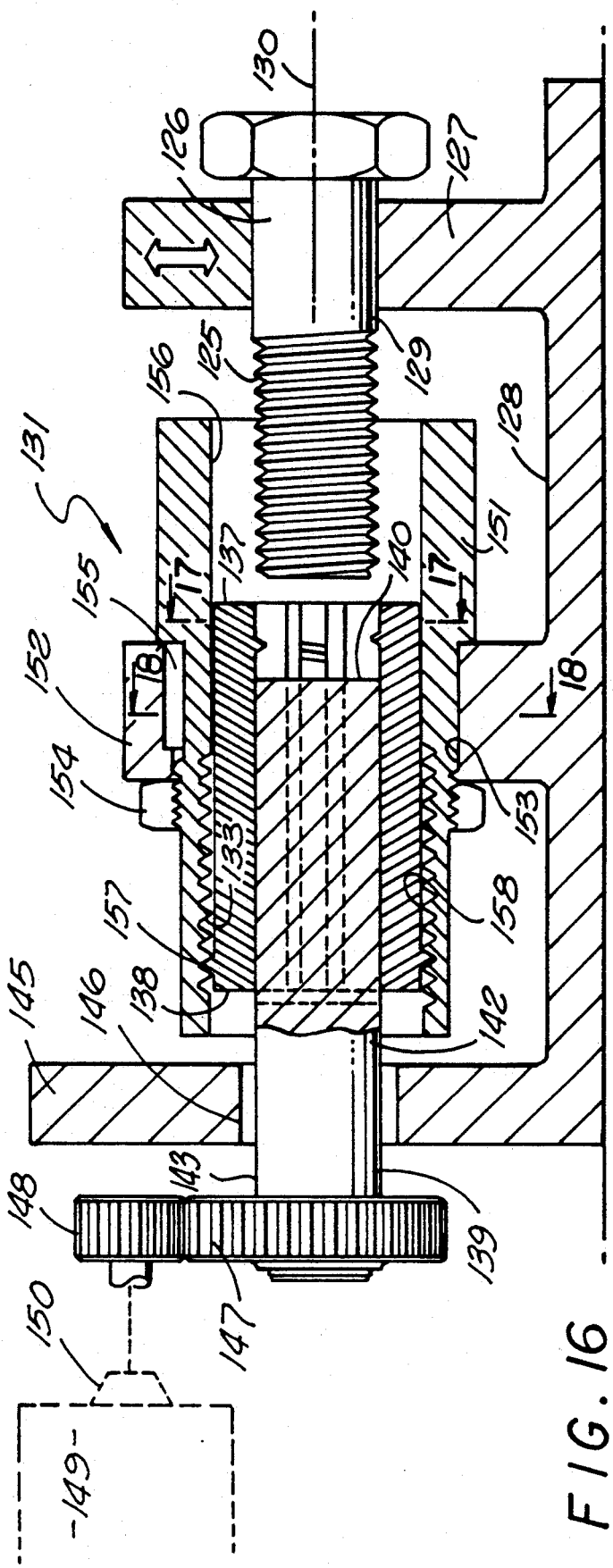
FIG. 16
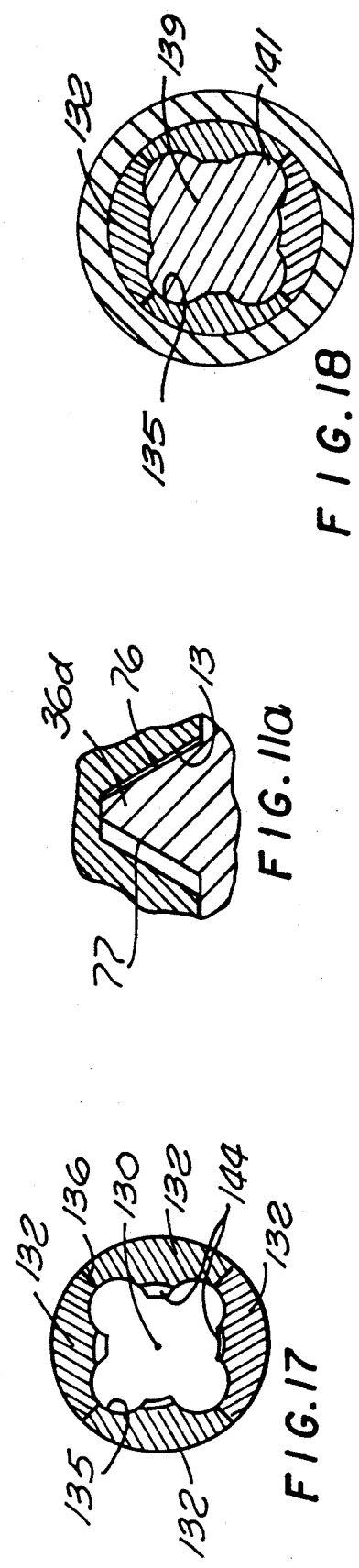
FIG. 18
FIG. 11a
FIG. 17

METHOD AND APPARATUS FOR FORMING THREADS WITH VARIABLE PITCH

This application is a continuation-in-part of U.S. patent application Ser. No. 7/783,429 filed Oct. 28, 1991, now abandoned.

This invention relates to improved methods and apparatus for forming threads of varying pitch.

BACKGROUND OF THE INVENTION

U.S. Pat. No. 4,842,464 issued Jun. 27, 1989 discloses a novel type of threaded fastener having a thread whose pitch varies progressively as the thread advances along its helical extent, in a manner improving the distribution of axial load which is applied to the different turns of the thread when the fastener is tightened against a work piece. The thread may be so designed that, in a predetermined highly preloaded condition to which the fastener may be tightened in use, the axial load applied to the fastener may be distributed substantially equally between all of its turns. The patent discloses two methods for machining a nut having a variable pitch thread of the discussed type. In one of those methods, the nut body and a single point threading tool are rotated and advanced axially relative to one another, with the amount of axial advancement per revolution varying to give the machined thread the desired varying pitch characteristic. The second disclosed method is similar, but utilizes a cutting tool having two projections spaced axially apart to define a thread shaped recess therebetween, so that the two projections similtaneously form opposite flank surfaces of the thread as the fastener and tool are moved rotatively and axially relative to one another. This still is essentially similar to a single point type of operation in that the tool, at any particular instant, is in engagement with and acts to shape the thread at only one location along its helical extent. Because of their 'single point' character, these methods are necessarily more difficult, time consuming, and expensive than if the thread could be formed by a conventional tap or die. However, the ordinary tap or die can not form a thread of varying pitch.

SUMMARY OF THE INVENTION

A purpose of the present invention is to provide a new way of forming a thread of varying pitch, such as the type of thread disclosed in the above identified patent, or other variable pitch threads for different purposes, more rapidly and efficiently than is possible utilizing the methods shown in the prior patent. Apparatus and methods embodying the invention employ a thread forming assembly which attains the principle advantages of a simple tapping operation, in that the assembly may have several cutting edges of different depths for simultaneously engaging a work piece at different locations along its length to form the thread; but at the same time the invention avoids the inherent limitations of conventional taps and dies which prevent their use in forming threads of varying pitch.

Structurally, a thread forming assembly constructed in accordance with the invention includes a plurality of separately formed threading elements each of which has a thread forming portion for engaging the work piece. These thread forming portions may be thread shaped cutting projections which progressively cut the thread of varying pitch in the work piece as the work piece and the assembly of threading elements move rotatively and axially relative to one another. The thread forming portions of the different elements may be of progressively increasing size, to form successive generally helical cuts on the work piece acting to gradually deepen the formed thread as the work piece and assembly move rotatively and axially relative to one another.

In order to give the thread being formed the desired varying pitch, the rotary and axial drive mechanism is so constructed that the rate of axial advancement per revolution between the work piece and each of the threading elements of the assembly is varied, and in addition the different separately formed elements of the assembly are shifted slightly axially relative to one another, so that all of the elements form together the increasing pitch thread.

The axial advancement and relative shifting movement of the different elements of the threading assembly may be attained by provision of a guide thread which is itself of varying pitch, and which controls the axial movement and positioning of the different threading elements as the threading operation progresses. Each of the elements may have a follower projection which extends into engagement with the guide thread, to shift that particular element axially in accordance with the variable pitch configuration of the guide thread. The projections of the different threading elements may engage the guide thread at different locations along its generally helical extent, with the threading portions of the elements engaging the work piece at correspondingly different locations. The assembly may be driven rotatively by a rotary drive part which may extend about the assembly and have non-circular surfaces engaging the different threading elements of the assembly in rotary driving relation. The elements of the assembly may also engage one another in a manner assisting in maintaining the elements in desired properly oriented positions within the assembly. When the thread being formed is an internal thread within a nut or other work piece, the different threading elements may engage and back up one another in a relation resisting radially inward movement, or movement of the different elements relative to one another circularly about the axis of the tool and thread, to maximize the effectiveness of the thread forming operation.

BRIEF DESCRIPTION OF THE DRAWINGS

The above and other features and objects of the invention will be better understood from the following detailed description of the typical embodiments illustrated in the accompanying drawings, in which:

FIG. 2 is a reduced view taken on line 202 of FIG. 1;

FIG. 3 is a fragmentary view corresponding to a portion of FIG. 1, but with the apparatus shown at the end of a threading operation;

FIG. 3a is an enlarged fragmentary representation of the portion of FIG. 3 enclosed within the circle 3a of FIG. 3;

FIG. 4 is a top plan view of the threading assembly taken primarily on line 4—4 of FIG. 3, with the guide thread, work piece and certain other elements shown in horizontal section;

FIGS. 5 and 6 are vertical sections taken on lines 5—5 and 6—6 respectively of FIG. 1;

FIG. 7 is a diagrammatic representation of the four cuts made by the four cutting edges of the FIG. 1 tool;

FIG. 8 is an enlarged fragmentary axial section taken through the nut and threading assembly during a final portion of the threading operation;

FIG. 9 is an enlarged fragmentary vertical section showing the portion of the upper threading element of FIG. 1 which engages and follows the guide thread;

FIG. 10 is a fragmentary horizontal section taken on line 10—10 of FIG. 9;

FIG. 10a is a transverse section taken on line 10a—10a of FIG. 10;

FIG. 11 is a fragmentary horizontal section taken on line 11—11 of FIG. 8;

FIG. 11a is a transverse section taken on 11a—11a of FIG. 11;

FIGS. 12 and 13 are transverse sectional views similar to FIG. 5, but showing two variational types of threading assembly;

FIGS. 15 and 16 are vertical sectional views of two additional variational arrangements;

FIGS. 17 and 18 are vertical sections taken on lines 17—17 and 18—18 respectively of FIG. 16;

DESCRIPTION OF THE PREFERRED EMBODIMENTS

Figure 1:
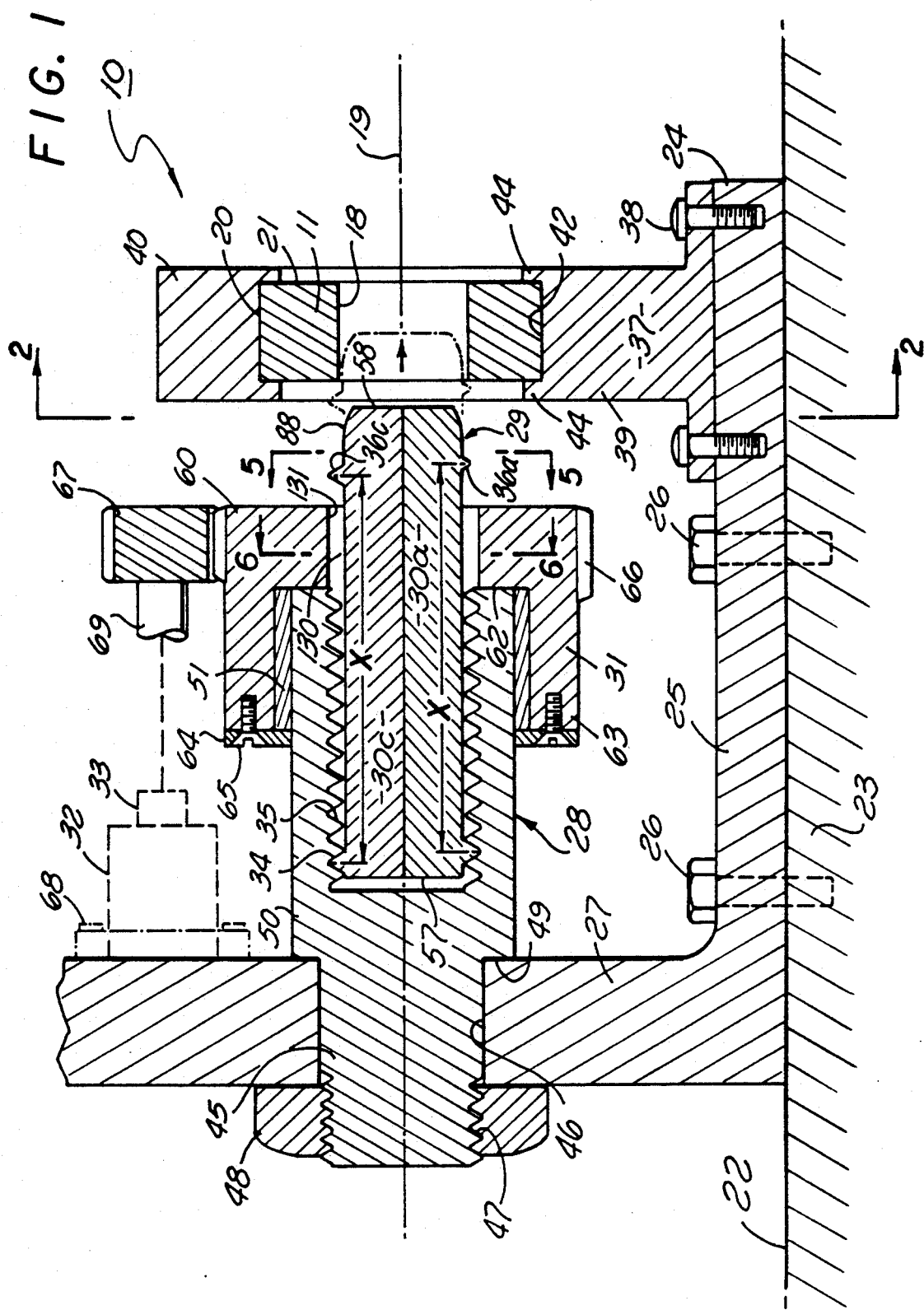
FIG. 1 is a vertical central section through a first form of thread tapping machine embodying the invention.

Referring first to FIG. 1, there is illustrated at 10 a first form of thread forming machine embodying the invention for tapping an internal thread of varying pitch within a nut 11. The thread formed by the machine is illustrated at 12 in FIGS. 3 and 8, and may be of a type disclosed and claimed in detail in U.S. Pat. No. 4,842,464, whose content is incorporated in this application by reference. Of the several different types of variable pitch threads described in that prior patent, the thread 12 formed by the machine illustrated in FIG. 1 of the present application corresponds to the thread illustrated in FIG. 3 of the prior patent.

The internal thread 12 of nut 11 may of course have any desired number of turns, but is typically illustrated as having only four turns in order to allow the individual turns to be shown on a relatively large scale. The axial sectional profile of thread 12 as illustrated in FIG. 8 is preferably uniform along the entire helical extent of that thread, except to the extent that the nut thread may if desired be chamfered at opposite ends in conventional manner. To avoid complexity in the drawings of the present application, no attempt has been made to illustrate such chamfering. Thus as seen in FIG. 8, the axial sectional profile of each of the individual turns of the nut thread is identical to the profile of each of the other turns, and in particular is defined by two opposite side faces 13 and 14 disposed at the usual 60 degree angle with respect to one another, and with the crest and root surfaces 15 and 16 of the thread typically extending cylindrically about the axis of the thread (or being rounded if desired).

The pitch of thread 12 of the nut is not uniform, but increases slightly and progressively as the thread advances rightwardly in FIGS. 3 and 8. Similarly, the lead angle or helix angle of the nut thread, which of course is related to the pitch, increases slightly and progressively from a minimum lead angle at the left end of the thread in FIG. 8 to a maximum lead angle at the right end of the thread. In FIG. 8, the increase in pitch and lead angle is attained by slightly and progressively increasing the axial width of the groove 17 and root surface 16 between successive turns of the nut thread as the thread advances rightwardly.

The nut blank 11 within which thread 12 is formed is supplied to the machine in the form illustrated in FIG. 1, with a cylindrical passage 18 formed in the nut and centered about an axis 19. The external configuration of the nut may be any desired shape, typically being defined by an external hexagonal surface 20 centered about axis 19 and two opposite end faces 21 disposed perpendicular to axis 19.

The threading machine or tool 10 may be mounted on a horizontal upper surface 22 of a rigid support base 23, with the frame or body 24 of the machine having a horizontal base portion 25 secured rigidly to support 23 as by bolts represented at 26. Frame 24 has at its left end in FIG. 1 an upwardly projecting portion 27 forming a rigid stationary vertical wall to which a member 28 is attached in fixed position. A threading assembly 29, consisting of a number of separately formed threading elements 30a, 30b, etc., is mounted for rotary movement about axis 19, and for axial movement, relative to member 28 and the work piece 11, to form the internal thread within that work piece. The assembly 29 may include any desired number of the separate threading elements, but in FIGS. 1 to 6 is typically illustrated as including four such elements, identified separately by the numbers 30a, 30b, 30c and 30d, respectively. The assembly of these elements is rotated about axis 19 by a rotary drive part 31 driven by a motor diagrammatically represented at 32 through a speed reduction gear unit 33. When rotated by drive part 31 about axis 19, the various individual elements of the threading or tapping assembly 29 are progressively advanced rightwardly in timed relation to the rotation, by virtue of engagement of projections 34 on the elements with a guide thread 35 of progressively increasing pitch formed within member 28. The varying pitch of guide thread 35 also causes slight axial shifting movement of the individual threading elements 30a, 30b, 30c and 30d relative to one another during their rotary and axial advancement. This axial shifting movement of elements 30a, 30b, 30c and 30d relative to one another may be extremely small, say only a few thousandths of an inch when the nut being formed is of the type disclosed in U.S. Pat. No. 4,842,464, and because it is so small can not be shown satisfactorily in drawings on the scale of FIGS. 3 and 4.

FIG. 3a illustrates the shifting movement in greatly enlarged and somewhat exaggerated form, by a view showing how the end surfaces of elements 30a, 30b and 30c, which are assumed to be aligned with one another in the initial FIG. 1 position, are slightly offset axially from one another in FIG. 3a, with element 30a shifted slightly to the right of element 30b, and with element 30b shifted slightly to the right of element 30c. Element 30d, which does not appear in FIG. 3a, is shifted slightly to the right of element 30a, because its projection 34 engages guide thread 35 to the right of the projections 34 of the other elements. As the asembly 29 moves rightwardly between the position of FIG. 1 and the position of FIG. 3, the internal thread 12 of varying pitch as illustrated in FIG. 8 is formed within the interior of nut body 11 by cutting teeth 36a, 36b, 36c and 36d formed on the different threading elements 30a, 30b, 30c and 30d.

The nut blank 11 is held in fixed position during the threading operation by a work support 37 which forms a vertically extending wall perpendicular to axis 19 secured rigidly at its lower end to frame 24 by screws 38. Work holder 37 may have a lower portion 39 permanently fixed to frame 24, and an upper section 40 which is connected by a hinge 41 (FIG. 2) for upward swinging movement about a horizontal axis parallel to axis 19 from the full line active threading position of FIG. 2 to an upwardly and laterally retracted open position as represented in broken lines in FIG. 2. When the upper section 40 is in its open position, the hexagonal nut body 11 can be inserted downwardly into a correspondingly hexagonal recess 42 formed in lower section 39 of the work holder, after which the upper section 40 can be closed, and be retained rigidly in closed position by a releasable latch represented at 43, to rigidly hold the nut body in the position illustrated in FIG. 1 during a threading operation. Sections 39 and 40 of the work holder have flanges 44 at opposite sides of the nut body, extending along the entire hexagonal periphery of the nut body at each of its sides in the closed condition of upper section 40 of the work holder, to effectively confine the nut body in fixed position between these peripheral flanges as seen in FIG. 1.

Member 28 is rigidly attached to vertical wall 27 of frame 24 by extension of a cylindrical portion 45 of member 28 through a cylindrical opening 46 in wall 27 centered about axis 19. Portion 45 of member 28 is a close fit within cylindrical opening 46, and has threads 47 at its end to which a nut 48 is connected to clamp wall 27 tightly between nut 48 and an annular transverse shoulder 49 formed on member 28. Rightwardly of wall 27, member 28 has an external cylindrical surface 50 centered about axis 19, with an internally and externally cylindrical bushing sleeve 51 being carried about surface 50 at its right end for journalling rotary drive part 31 to rotate about axis 19 relative to member 28. The bushing 50 may be secured in fixed position relative to member 28, or may if desired be integral with member 28. Preferably, bushing 51 is a pressed fit on the outer surface 50 of member 28, to be rigidly retained in fixed position relative to member 28 by that pressed fit relationship.

When assembly 29 includes four separate threading elements, those elements may have the cross sectional configuration illustrated in FIGS. 5 and 6, with the inner extremities of the elements meeting at the axis 19 of the assembly. In extending outwardly from that axis, each element 30a, 30b, 30c and 30d is defined by two surfaces 52 and 53 (see element 30a in FIG. 5), which surfaces lie in two planes 54 and 55 which are prependicular to one another and which contain the axis 19 and intersect at that axis. These two surfaces 52 and 53 thus project radially outwardly from the axis, and each engage a corresponding radial surface 52 or 53 formed on the two adjacent threading elements of assembly 29, so that the four elements 30a, 30b, etc. act to effectively retain one another against movement radially inwardly toward axis 19, and also act to retain one another against movement of any of the elements relative to the others circularly about axis 19. The abutting engagement of the inner surfaces 52 and 53 of the threading elements 30a, 30b, 30c and 30d in this way enhances the rigidity of all of the threading elements and resists their deformation as a result of the threading forces applied to cutting teeth 36a, etc., and in conjunction with the rotary drive part 31 maintains the elements 30a, 30b, 30c and 30d of assembly 29 in properly oriented relation during the entire threading operation.

Each of the threading elements 30a, 30b, 30c and 30d has at its outer extremity a corresponding one of the thread cutting teeth or projections 36a, 36b, 36c or 36d. The first of these, projection 36a, is the first to contact the nut body 11 during rotary and axial advancement of threading assembly 29, and is shaped to take an initial relatively shallow cut. For this purpose, projection 36a does not have a full thread profile as viewed in axial section (see the downwardly projecting cutting tooth 36a in FIG. 1), but may have an essentially V-shaped axial sectional configuration extending radially outwardly through only a portion of what is to be the ultimate radial extent of the thread being formed. As the assembly 29 rotates in a counter-clockwise direction as viewed in FIG. 3, the second cutting tooth to engage the nut body is tooth 36b, which takes a second somewhat deeper cut in the nut body. For that purpose, tooth 36b may be of V-shaped transverse section but project somewhat farther radially outwardly than the tooth 36a which made the first cut. The third cutting projection 36c, formed on the third element 30c, may have a full thread profile, to deepen the cut in the nut body to that of a full 60 degree thread. The fourth tooth 36d, formed on the fourth threading element 30d, may also have a full 60 degree thread profile, and is illustrated in FIG. 8. This final cutting tooth 36d moves in a slightly out-of-phase relationship with respect to teeth 36a, 36b and 36c, as will be discussed in greater detail at a later point, and by virtue of this out-of-phase relationship takes a cut slightly offset axially relative to the cuts made by teeth 36a, 36b and 36c, to thereby widen groove 17 and leave the formed thread 12 of uniform axial sectional configuration.

In FIG. 8, the cutting tooth 36d is illustrated in full lines, and is acting to take a small cut on the surface 13 at the right side of the thread groove. When the preceding tooth 36c was at the same location during its essentially helical movement, that tooth was located as illustrated in broken lines in FIG. 8, shifted to the left of the illustrated position of tooth 36d, and acted to take a final cut on the surface 14 at the left side of the groove.

FIG. 7 illustrates diagrammatically in enlarged form the effective axial sectional profile of the various cutting teeth or edges of the various elements of tapping assembly 29. As seen in FIG. 7, the first cutting tooth 36a has three cutting edges defining the profile of a portion of a standard 60 degree thread, with the edges including two converging edges 136 disposed at an angle of 60 degrees to one another, and a crest forming edge 36 extending therebetween. This cutting tooth 36a makes an essentially V-shaped but shallow cut in the work piece 11. The second cutting tooth 36b has a similar 60 degree axial sectional profile, to make a similarly shaped but radially deeper cut in the work piece. The third cutting tooth 36c is typically illustrated as having a full radial depth, to complete the formation of an inter-thread groove of standard shape. All of these first three cuts may be directly aligned radially with one another to follow exactly the same helical path in the work piece, with the only difference being the depth of cut. The fourth cutting edge 36d, however, is offset slightly in an axial direction, as discussed in connection with FIG. 8, to slightly deepen the cut formed at the rear side 13 of thread 12 being formed in the work piece, so that the axial section profile and axial thickness of the thread 12 remains uniform along its entire helical length, while the axial width of groove 17 gradually increases.

If more than four cuts are necessary in order to form the complete tooth in the nut, the number of threading elements 30a, 30b, 30c and 30c and the number of teeth 36a, 36b, 36c and 36c can be increased, as for instance in the arrangement illustrated in FIG. 13 which will be discussed at a later point. Also, the cutting teeth 30a, 30b, 30c and 30c of assembly 29 may be designed to take more gradual cuts, so that after the fourth cut has been taken the thread of the nut is still only partially formed, with one or more additional threading operations then being formed by other tools similar to the tool 10 of FIG. 1 but having cutting projections of greater radial extent, to progressively deepen the thread to its final form.

Circularly between the cutting teeth 36a, 36b, 36c and 36d, the threading elements 30a, 30b, 30c and 30d have outer surfaces 56 which are recessed radially inwardly in concavely curving fashion as illustrated in FIGS. 5 and 6 to provide spaces for reception of cuttings removed from the nut body 11 during the threading operation. The recesses formed by surfaces 56 extend along the entire length of each of the elements 30a, 30b, 30c and 30d from their left ends 57 to their right ends 58 as viewed in FIGS. 1 and 3. These grooves are of uniform cross section along the entire length of each of the elements 30a, 30b, 30c and 30d, and are engaged by correspondingly curved radially inwardly convex surfaces 59 formed in rotary drive part 31, to key the drive part to elements 30a, 30b, 30c and 30d and enable the drive part to turn those elements about axis 19. The inner curving surfaces 59 of part 31 which project into interfitting relationship with the recessed surfaces 56 in assembly 29 are of uniform cross section through the entire axial thickness of a radially inwardly projecting flange portion 60 of part 31, between two planar parallel surfaces 61 and 62 of that portion disposed transversely of axis 19. The interfitting engagement between part 31 and elements 30a, 30b, 30c and 30d thus allows part 31 to rotate the elements of assembly 29 about axis 19, but permits axial movement of the elements relative to part 31.

Each of the elements 30a, 30b, 30c and 30d has a radially outer surface 130 which extends axially between the projection 34 and the cutting tooth 36a, 36b, 36c or 36d of that element, which surface may be curved cylindrically about axis 19 at a diameter slightly less than the diameter of bore 18 in nut body 11. Drive part 31 may contain axially extending grooves 131 radially outwardly of surfaces 130 to form gaps radially between part 31 and elements 30a, 30b, 30c and 30d dimensioned to pass projections 34 or cutting projections 36a, 36b, 36c, and 36d axially through these grooves as elements 30a, 30b, 30c and 30d are inserted axially into part 31 during assembly of the parts.

To the right of cutting teeth 36a, 36b, 36c and 36d in FIGS. 1, 3 and 4, each element has a radially outer surface 188 similar to and aligned with surfaces 130 and curving cylindrically about axis 19 at a diameter fitting closely within bore 18 in nut body 11 to engage that bore and hold elements 19 in accurately centered relation with respect to axis 19 as the cuts are made. Rightwardly beyond surfaces 230, elements 30a, 30b, 30c and 30d have surfaces 88 which may be curved conically about axis 19, or slightly rounded, to taper slightly from the diameter of surfaces 130 and 188 and bore 18 to a slightly reduced diameter for assisting in initially locating the elements within the nut body as they advance axially thereinto.

Drive part 31 has an internally and externally cylindrical portion 63 projecting leftwardly from its portion 60 at the exterior of bushing 51, with the inner surface of portion 63 engaging bushing 51 to journal part 31 for its rotary motion about axis 19 relative to member 28. An annular retainer plate 64 is secured to an end of portion 63 of member 31, as by screws 65, and projects radially inwardly to engage the left end of bushing 51, in a manner retaining part 31 against axial movement relative to bushing 51 and the connected member 28. Externally, part 31 has an annular series of gear teeth 66 centered about axis 19 and engaging the teeth of a gear 67 which is driven by motor 32 through speed reduction assembly 33 as illustrated diagrammatically in FIG. 1. The motor 32 and reduction gear assembly 33 are secured in fixed position relative to frame 24 as by fasteners represented at 68, and the shaft 69 of gear 67 is of course also journalled for rotation about a fixed axis relative to the frame and the rest of the tool.

The guide thread 35 formed within member 28 is centered about axis 19, and engages a projection 34 formed on each of the elements 30a, 30b, 30c and 30d so that as assembly 29 and its elements 30a, 30b, 30c and 30d rotate about axis 19 relative to the stationary member 28, the projection 34 of each element is caused by its engagement with thread 35 to gradually advance rightwardly in FIGS. 1 and 3, to correspondingly advance the thread cutting projection 36a, 36b, 36c or 36d of that particular threading element. The thread cut in nut 11 is thus given the same rate of axial advance as the guide thread 35 by which the threading elements are moved rightwardly. To give the formed thread in nut 11 a progressively increasing pitch, the guide thread 35 of FIG. 9 is formed to itself to have a progressively increasing pitch as it advances from left to right. Desireably, the axial width of the thread groove 70 between successive turns of guide thread 35 remains uniform along the entire length of thread 35, so that each of the follower projections 34 can be a close fit within that groove and avoid relative axial movement between the threading elements and member 28. To attain this result, the progressive increase in pitch of thread 35 takes the form of an increase in axial thickness of the thread profile, as seen in FIG. 9, and as is best appreciated by comparison of the axial width of the crest surface 71 of thread 35 at the locations of its various turns. In FIG. 9, it will be apparent that the width of the crest surface is relatively narrow on the turn seen at the left end of that figure, is slightly greater at the second turn, and increases further at the third and then the fourth turn. This gradual increase in axial thickness of the thread turn, with no change in axial width of the intermediate thread groove, continues through the entire axial length of thread 35.

When the nut being formed by the apparatus of the present invention is of the type disclosed in U.S. Pat. No. 4,842,464, the actual change in pitch may be very slight. In FIG. 9, the increase in axial thickness of the thread as it advances rightwardly is exaggerated for illustrative purposes. Similarly, in FIG. 8, the change in width of the inter-thread groove is exaggerated. In the smaller scale views of FIGS. 1 and 3, no attempt has been made to illustrate the change in pitch.

The projections 34 formed on the different threading elements 30a, 30b, 30c and 30d may be identical and configured to occupy the entire axial width of the inter-thread groove of guide thread 35, and are desirably shaped to occupy that width without play in all axial positions of the threading elements. For this purpose, each of the projections 34 may have conically curving surfaces 134 at its opposite sides (FIGS. 9, 10 and 10a) centered about an axis 135 extending radially with respect to and intersecting axis 19. Conical surfaces 134 converge radially outwardly at the same 60 degree angle as do the opposite flank surfaces 72 and 73 of the engaged thread turns, to maintain line contact with both of those turns when surfaces 72 and 73 are disposed at slightly changing lead angles as the pitch of the thread progressively increases. Circularly in advance of and circularly behind conical surfaces 134, each projection 34 may have portions 234 which are thinner axially than the conical portion of the projection to avoid contact with surfaces 72 and 73 as the lead angle of the thread 35 changes. These portions 234 may have the radially outward 60 degree tapering configuration shown in FIG. 10a, and are provided to strengthen the projections 34 and prevent damage thereto under the force encountered in use.

Each of the thread cutting projections 36a, 36b, 36c and 36d of the threading elements is cut off at its leading end by a transverse surface 74 (FIG. 11) to provide cutting edges 75 shaped in correspondence with one of the configurations illustrated in FIG. 7, for making a cut of that configuration in the interior of nut body 11. Circularly behind the leading cutting edges 75 of each of the projections 36a, 36b, 36c and 36d, each of these cutting projections may be of tapering gradually narrowing thickness t in a generally axial direction, so that the cutting edges can properly engage the material of the work piece as the pitch of the formed thread changes. Stated differently, the right and left side surfaces 76 and 77 of each cutting projection converge toward one another as they extend in a trailing direction in FIG. 11. Surface 76 at the right side of the cutting projection is disposed at an angle at least as great as (preferably substantially equal to) the maximum lead angle of thread 12 and its surface 13 at the right end of the nut, while surface 77 at the left side of the cutting projection is disposed at a lead angle at least as small as (preferably substantially equal to) the minimum lead angle of thread 12 and its surface 14 at the left end of the thread. In extending radially outwardly (see FIG. 11a), surfaces 76 and 77 converge toward one another at a 60 degree angle corresponding to that of the cutting edges 75 and the flank surfaces 13 and, 14 formed thereby. Each projection 36a, 36b, 36c or 36d may be formed to the illustrated shape by machining surfaces 76 and 77 in a lathe or similar tool to advance at lead angles corresponding to the above discussed maximum and minimum lead angles respectively of thread 12 and its surfaces 13 and 14.

The cutting tooth 36a on element 30a is directly axially aligned with the projection 34 on that same element 36a. Similarly, the cutting element 36b, 36c or 36d of each of the other elements 30b, 30c or 30d is directly axially aligned with the corresponding thread follower projection 34 of the same element. The axial distance x between cutting projection 36a of element 30a and the thread follower projection 34 of the same element 30a is the same as the corresponding axial distance between the cutting projection 36b and the thread follower projection 34 of element 30b, and is also the same as the corresponding axial distance between cutting projection 36c and projection 34 of element 30c.

When the follower projection 34 of element 30a is in engagement with a particular portion of thread 35, as for instance in the position of element 30a illustrated in FIG. 1, the thread cutting projection 36a of element 30a is at that instant cutting a portion of the thread in nut body 11 at a location directly axially aligned with the projection 34 of the element 30a but offset rightwardly therefrom through the distance x. Similarly, when assembly 29 is then rotated to a position in which the second element 30b reaches the location of the element 30a in FIG. 1, the follower projection 34 of that second element 30b is in engagement with the same portion of thread 35 as was element 30a in the FIG. 1 position, and at that instant the cutting projection 36b of element 30b is making a cut in exactly the same portion of the thread in nut 11 as was the cutting projection of element 30a in the FIG. 1 position of the parts. When the third element 30c reaches the position of element 30a in FIG. 1, the projection 34 of element 30c engages thread 35 at the same position as did projection 34 of element 30a in FIG. 1, so that the cutting projection of element 30c then forms a still deeper cut in the same portion of the thread in nut body 11. Since the projections 34 of the different threading elements are at any instant in engagement with different portions of guide thread 35, with those portions of thread 35 having different pitches and different lead angles, the elements 30a, 30b, 30c and 30d advance axially at slightly different rates and therefore shift slightly axially relative to one another, the ultimate result being that together they form the desired thread of variable pitch in nut 11.

In order to enable the fourth cutting projection 36d, which is formed on the fourth element 30d, to be slightly out of phase with the other elements and make a cut shifted slightly forwardly relative to the other elements as discussed in connection with FIG. 8, the axial distance y between the cutting edge 36d and projection 34 of element 30d (see FIG. 4) is less than the axial distance x between the corresponding projections of the other three elements. The difference between the distance x for the first three elements and the distance y for the final element is preferably equal to the effective pitch of guide thread 35 at the point at which the first cutter 36a first contacts nut body 11 to commence the cutting action during a threading operation. The term "effective pitch" is defined the same as in U.S. Pat. No. 4,842,464, to refer to the axial pitch distance which would occur between a particular point in question and a corresponding portion of the next turn of the thread if the lead angle (helix angle) of the thread did not change and were to remain the same as at the specified point.

FIG. 12 is a view similar to FIG. 5 but showing a variational form of tapping or threading assembly 78 which may be utilized in lieu of the assembly 29 of the first form of the invention. In FIG. 12, the four threading elements 79 may be the same as elements 30a, 30b, 30c and 30d of the first form of the invention, except that the abutting planar axially extending surfaces 81 of the threading elements (corresponding to surfaces 52 and 53 of FIG. 5) are rotated in a counterclockwise direction relative to their positions in FIG. 5 so that these surfaces 81 extend directly radially outwardly to essentially the locations of the trailing ends of the various cutting projections 82. As a result, forces applied to the cutting teeth 82 by the work during a cutting operation, that is, forces resulting from the resistance offered by the work to the cutting action, are exerted by each of the elements 79 against the next trailing element 79 in a direction approximately directly perpendicular to the engaging surfaces 81, to thereby enable each of the elements to better resist the forces applied by the element just circularly ahead of it. The configurations of the cutting teeth in FIG. 12 may be the same as discussed in connection with the cutting teeth of FIG. 5.

As previously mentioned, the number of threading elements provided in the threading assembly 29a or 78 may be varied from the number 4 as typically illustrated in FIGS. 1 through 12. For example, FIG. 13 illustrates an arrangement in which seven threading elements 83 are utilized, each taking the shape essentially of a segment of a circle centered about the rotary axis 85 of the assembly, and each having a thread cutting projection 84 at its outer extremity. The abutting surfaces of circularly adjacent threading elements in FIG. 13 may lie in planes extending directly radially outwardly from the axis to the trailing ends of the various cutting teeth, as discussed in connection with FIG. 12. In both FIG. 12 and FIG. 13, the radially outer surfaces of the threading elements may be recessed inwardly as represented at 87 in FIG. 13, to provide regions within which cuttings can be received radially between the threading assembly and the work part. In FIG. 13, as in FIG. 3 and FIG. 12, the different cutting teeth may be of progressively increasing radial extent, so that a first tooth 84a in FIG. 13 takes a shallow helical cut in the work piece, with the next successive tooth 84b making a slightly deeper cut, and with the successive teeth taking progressively still deeper cuts until a full thread profile is formed. The circularly last tooth 84g, or perhaps the last two cutting teeth, may be slightly out of phase with the other teeth as discussed in connection with tooth 36d of the first form of the invention, to progressively widen the inter-thread groove as illustrated in FIG. 8.

In placing the apparatus of FIG. 1 in use, the nut blank 11 is first clamped in work holder 37, and motor 32 is then energized to drive gear 67, which turns rotary drive part 31 about axis 19, with resultant rotation of assembly 29 and its elements 30a, 30b, 30c and 30d about the axis in a counterclockwise direction as seen in FIGS. 5 and 6. As elements 30a, 30b, 30c and 30d turn about the axis, their projections 34 are gradually cammed axially by guide thread 35 within which they are received. That guide thread gradually advances elements 30a, 30b, 30c and 30d to the right, with tapered surfaces 88 at the ends of the elements extending into bore 18 in the nut blank to assist in maintaining the threading elements in centered properly oriented positions in the work piece. Just prior to engagement of the first cutting tooth 36a with the work piece, cylindrical surfaces 188 of elements 30a, 30b, 30c and 30d advance into and are a close fit within bore 18 in accurate locating relation, and remain in that closely fitting relation in the bore to keep the centered condition as the cutting progresses. Continued rotation and axial advancement of assembly 29 causes the cutting teeth to form progressively deepening cuts in the nut, producing the desired internal thread. Because of the increasing pitch of guide thread 35, the thread formed in the nut has a correspondingly increasing pitch, and because of the out of phase relationship of the final cutting tooth with respect to the other cutting teeth the groove of the nut gradually increases in axial width. The out of phase relationship results from the fact that the axial spacing y between projection 34 and cutting tooth 36d of element 30d is less than the corresponding distance x of the other elements. As stated previously, the difference between dimensions x and y is preferably equal to the effective pitch of guide thread 35 at the point at which it engages projection 34 of element 30a when cutter 36a of element 30a first commences a cutting action in the nut body. The difference between x and y is thus preferably equal to the effective pitch of the thread formed in the nut at its left end. Because dimension y is less than dimension x, projection 34 of element 30d engages any particular portion of guide thread 35 circularly in advance of the projections 34 of the other elements, so that the gradual increase in pitch of the thread produced by element 30d is in effect shifted one turn to the right with respect to the cuts made by the other elements.

To describe this feature more specifically, consider again the position of the parts in which cutting edge 36a of element 30a initially contacts the nut. In that position, the portion of guide thread 35 which is in engagement with projection 34 of element 30a has a certain effective pitch and lead angle producing the same effective pitch and lead angle in the work piece. When elements 30b and 30c reach the same point, their projections 34 engage exactly the same portion of guide thread 35 to produce the same effective pitch and lead angle in the work piece. When element 30d is making a cut at the same point in the nut, however, the projection 34 of element 30d is in engagement with guide thread 35 one turn to the right of where the projections 34 of the other elements engaged the guide thread when they were making cuts at that point. The effective pitch and lead angle of the guide thread are greater at this rightwardly shifted point of contact with the guide thread, and thus the cut made by element 30d is in effect shifted slightly to the right (see FIG. 8) through an axial distance which gradually increases because of the progressive increase in pitch of thread 35.

In some instances, it may be desirable to first advance the threading assembly only partially axially into the nut, to form only a first portion of the thread, then unscrew the assembly from the nut before advancing the assembly rotatively and axially back into the nut to a greater axial depth, and repeat this procedure at increasing depths until the full axial length of the thread has been formed.

If it is desired that the thread formed in the nut have an inter-thread groove of uniform axial width, with the increasing pitch of the formed thread being represented by an increasing axial thickness of the thread profile (as in the guide thread 35 represented in FIG. 9), the fourth cutting tooth 36d may be caused to follow exactly the same helical path as the other cutting edges, without the discussed out of phase relationship. To attain this result, the distance y of FIG. 4 may be the same as the distance x of that figure and FIG. 1.

Figure 14:
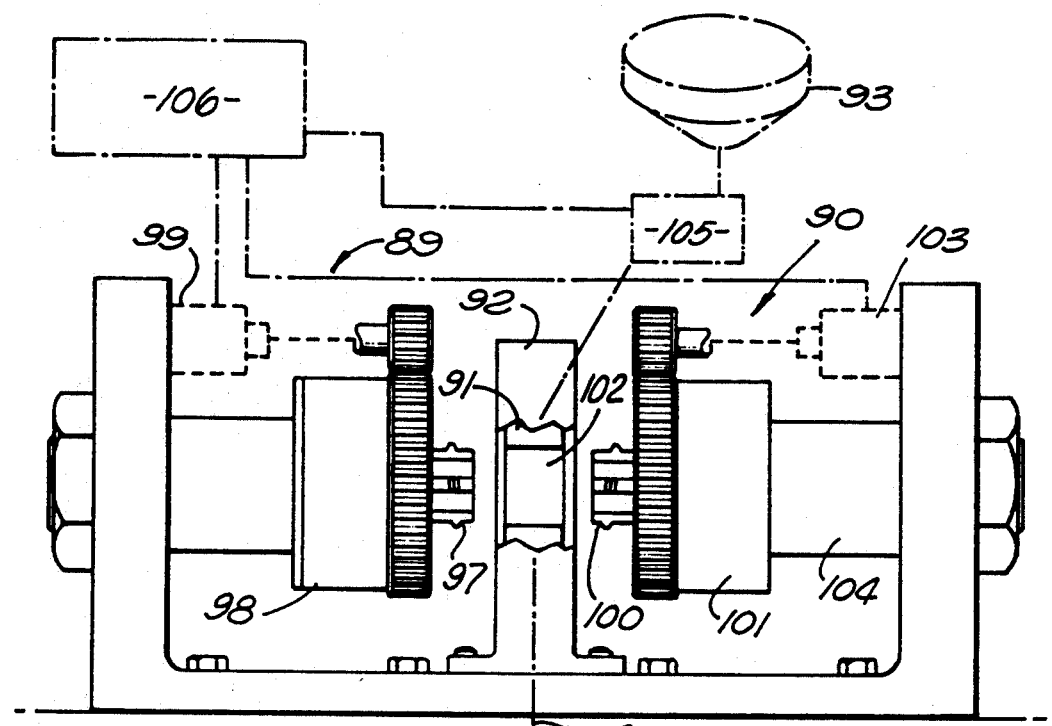
FIG. 14 is a side elevational view of a variational machine embodying the invention.

FIG. 14 shows a variational arrangement in which two threading tools 89 and 90 may be provided for performing two successive tapping operations in timed relation to one another from opposite sides of a nut blank 91. The nut blank may be detachably held in position for the threading operations by a work holder 92 which may be the same as that illustrated at 37 in FIG. 1, or may be any other convenient type of work holder adapted to releasably clamp the work in position. A series of nut blanks may be successively and automatically fed to the work holder 92 from a hopper diagrammatically represented at 93, through a feed chute represented at 94, with the threaded nuts being automatically discharged through a chute represented at 95 to a collection bin 96, all in properly timed relation to the operation of tools 89 and 90.

The tool 89 at the left side of the work support in FIG. 14 may be identical with the apparatus illustrated in FIG. 1, including a threading assembly 97 corresponding to assembly 29 of FIG. 1, rotated by a drive part 98 (corresponding) to part 31 of FIG. 1) driven by a motor 99. A guide thread such as that illustrated at 35 in FIG. 1 is formed in a part 198 corresponding to part 28 of FIG. 1 and acts to progressively advance the threading assembly 97 rightwardly as it turns, to form a thread of progressively increasing pitch as illustrated in FIG. 8 within nut 91.

The second tool 90 at the right side of the work holder 92 in FIG. 14 is essentially the same as but in most respects a mirror image of the tool 89 at the left side of the work holder, and includes a threading assembly 100 having elements such as those shown at 30a, 30b, 30c and 30d in FIGS. 1 through 11, and having a rotary drive part 101 for turning assembly 100 about the same axis 102 as assembly 97. Part 101 is driven by a motor 103 having a reduction gear assembly, and the threading assembly 100 is progressively actuated leftwardly by a stationary guide thread serving the function of guide thread 35 of FIG. 1. The guide thread within part 104 increases in pitch in a left to right direction in correspondence with thread 35 of FIG. 1, and acts to cause the various elements of assembly 100 to move leftwardly at a gradually reducing rather than increasing rate to follow essentially the same variable pitch path as assembly 29 with respect to the work part.

The thread cutting projections of assembly 97 (corresponding to projections 36a, 36b, 36c and 36d of the FIG. 1 form of the invention) may cut into the nut body more gradually than in the FIG. 1 arrangement, so that the entire assembly 97 forms only approximately one half of the desired depth of thread within the interior of the nut. That is, the four cutting teeth of assembly 97 may be of progressively increasing radial extent, but with the fourth of these projections being of only about one-half of the desired ultimate radial depth of the thread to be formed in the nut body. The four cutting edges of the second assembly 100 may then be of greater depth, progressively deepening the cut from one-half depth to full depth. One or more of the cutting teeth of assembly 100 may be in the out of phase relationship of the tooth 36d of FIG. 5, to widen the groove to the FIG. 8 condition. Also, one or more of the cutting teeth of assembly 97 may be out of phase to form a groove widening partial cut. In order to allow each of the assemblies 97 and 100 to move entirely through the nut body 91 without interference by contact with the other of these two assemblies, both of the assemblies may be retracted axially away from the nut body far enough to allow the other assembly to move into position. In FIG. 14, this is typically attained by cutting off part or all of the tapering extremity 88 of the assembly 29 of FIG. 1.

The two tools 89 and 90 of FIG. 14, and an automatic nut feed mechanism represented diagrammatically at 105, may be under the control of a timer or computer 106 to operate the various portions of the apparatus in timed relation. Motors 99 and 103 may be digital motors for precise control of their rotation in two opposite directions. During a cycle of operation, timer 106 first actuates the feed mechanism 105 to deliver a nut body 91 to work holder 92 for rigid clamping thereof in the tapping position of FIG. 14. After the nut is held by the work holder, timer 106 energizes motor 99 to rotate part 98 and assembly 97 through a predetermined number of turns in a first direction for advancing the assembly 97 rightwardly and rotatively to form a first cut of progressively increasing pitch in the nut body. After the cutting edges of assembly 97 have moved entirely through the nut body to its right side, timer 106 reverses motor 99 to turn assembly 97 in the opposite direction through a predetermined number of turns for retracting assembly 97 to its FIG. 14 position. The timer 106 then energizes motor 103 to rotate part 101 and thereby rotate assembly 100 and advance it leftwardly in FIG. 14, to deepen the cut formed in the body to its final configuration. After the cutting edges of assembly 100 have moved entirely through the nut body, the rotation is reversed by timer 106 to rotate motor 103 through a predetermined number of turns in the opposite direction, and retract assembly 100 to its FIG. 14 position. The timer 106 then actuates feed mechanism 105 to release the nut body to hopper 96, and feed a next successive nut body to holder 92 for commencement of another threading operation. In order to allow cutting assembly 100 to properly deepen the cut formed by assembly 97, the two assemblies are accurately positioned relative to one another and relative to the work part to assure that they follow the same essentially helical paths of progressively varying pitch.

The various elements of the assembly 100 of FIG. 14 have projections of the same type illustrated at 34 in FIGS. 3 and 4, with those projections for a number of the elements being spaced from the cutting teeth of those elements by a distance such as that represented at x in FIG. 4. For the elements which are to be driven in an out of phase relationship to widen the groove, the distance corresponding to that represented at y in FIG. 4 is in FIG. 14 slightly greater than the distance x rather than slightly less than that distance as in FIG. 4, to compensate for the fact that the assembly 100 moves leftwardly during a tapping operation while the assembly 97 moves rightwardly.

Instead of controlling axial advancement of the threading elements by a guide thread such as that shown at 35 in FIG. 1, other means for effecting axial advancement may be provided. One such arrangement is illustrated diagrammatically in FIG. 15, in which a threading assembly 107 for forming an internal thread within a nut 108 held by a rotary power driven chuck 109 includes a number of threading elements 110 which may have cross sections similar to those illustrated at 30a, 30b, 30c and 30d in FIG. 5, with thread cutting projections 111 formed on right end portions of the threading elements and corresponding to those illustrated at 36a, 36b, 36c and 36d in FIG. 5. A tubular part 112 centered about axis 113 of the tool 315 is attached rigidly to frame 114 by nut 115, and contains an axial passage 116 within which the threading elements 110 are held and guided for only axial movement. Part 112 may have the same internal configuration as part 31 in FIG. 6, to interfit with elements 110 in a manner retaining them against rotation while at the same time permitting the desired axial movement of elements 110 as a unit.

Each of the elements 110 may have a series of rack teeth 117 formed in its radially outer surface, engaged by mating teeth of a gear 118, which is connected to part 112 for rotation relative thereto about a transverse axis, and which is driven by an associated digital electric motor 119 to advance and retract each of the elements 110 in correspondence with rotation of its associated motor. The four digital motors 119 which drive the gears 118 associated with the four threading elements 110 respectively are reversible, to either advance or retract elements 110 relative to element 112 and the work part, and relative to one another, in accordance with signals supplied by a control computer, timer, or other control unit 120. That unit 120 also acts through a control line 121 to energize a motor 122 acting through a reduction gear assembly 123 and gear 124 to rotate chuck 109 and nut blank 108 gripped thereby about axis 113.

Figure 15:
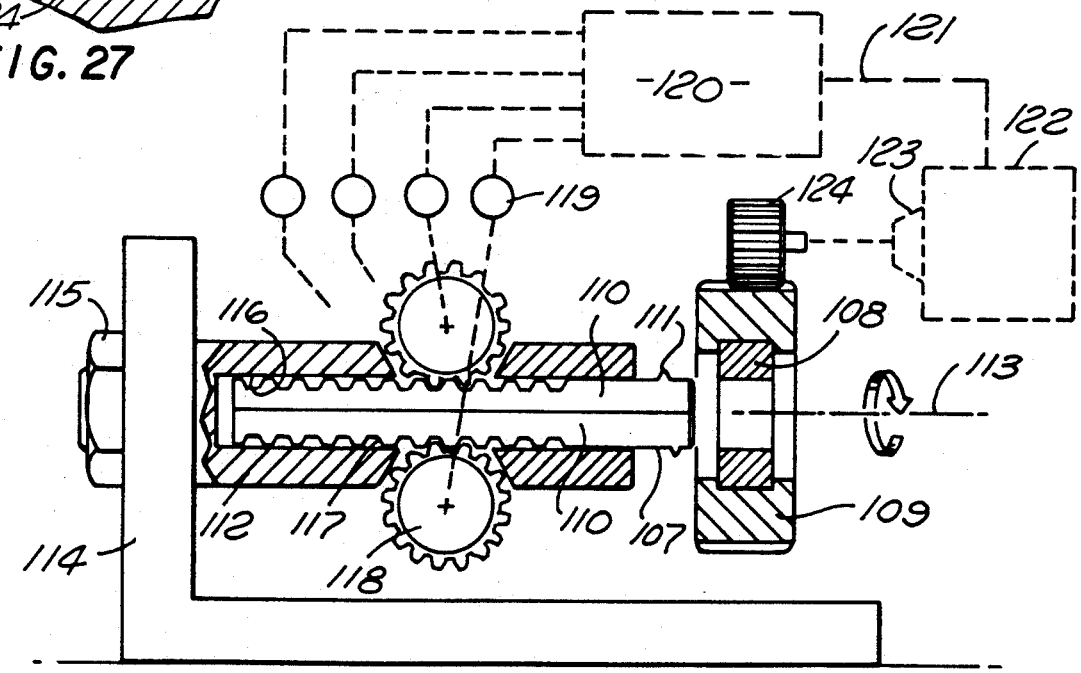
Figure 19:
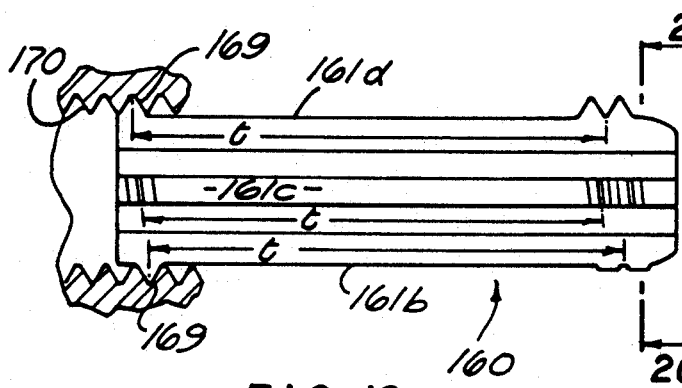
FIG. 19 is a top plan view similar to FIG. 4 of a variational type of tapping assembly in which each thread forming element has two cutting projections.
Figure 20:
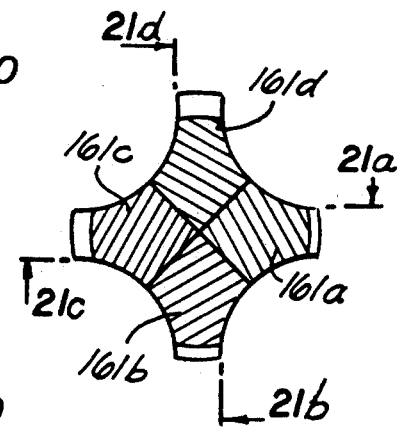
FIG. 20 is a transverse section taken on line 20—20 of FIG. 19.

In using the apparatus of FIG. 15, control unit 120 operates the four motors 119 and the additional motor 122 in a predetermined timed cycle. As motor 122 rotates the work part 108 about axis 113, the four motors 119 are energized to gradually advance elements 110 rightwardly along axis 113, causing their cutting elements 111 to progressively cut in nut 108 a thread of progressively increasing pitch corresponding to the thread illustrated in FIG. 8. Unit 120 varies the energization of the four motors 119 differently and in a pattern causing elements 110 to advance relative to the work part and advance slightly axially relative to one another in exactly the same pattern of axial movement as is produced by guide thread 35 of FIG. 1. After each of the five digital motors has been rotated through precisely the right number of turns, and in precisely the right timed relationship, to complete the threading operation, with cutting elements 110 then being rightwardly beyond the nut body 108, control unit 120 reverses all of the motors and energizes them through a proper number of revolutions and in a properly timed relation to retract assembly 107 from the nut as the nut is rotated by motor 122 and thereby in effect unscrew the nut from the threading elements. The threaded nut body may then be removed and a next successive nut blank be connected into the chuck. The control unit 120 may of course also control the timing of an automatic feed device for delivering successive nut bodies into the chuck prior to a threading operation, and automatically delivering the threaded nut to a collection bin after the threading has been performed.

In lieu of the rack and pinion type axial advancement mechanism typically illustrated in FIG. 15, any other convenient apparatus for effecting axial movement of the threading elements 110 may be employed. Also, the relative rotary movement between tapping assembly 107 and the nut body 108 may be effected by rotating assembly 107 rather than the nut body. Further, the relative axial movement may be produced in part by powered axial movement of nut body 108, with the cutting elements 110 being shifted slightly in an axial direction relative to one another while the nut body is advancing axially to produce the combined relative axial movement discussed in connection with the first form of the invention. If chuck 107 does move axially, the rotary motion may be produced either by power rotating the chuck or by power rotating assembly 107. In short, any combination of rotary and axial movements of elements 110 and nut body 108 may be utilized so long as the relative motion between elements 110 and nut body 108 and the relative movement between the different elements 108 themselves corresponds to the movements discussed in connection with FIG. 1.

FIGS. 16 through 18 show another form of the invention in which the thread 125 being formed is an external thread on a work piece 126 such as the illustrated bolt. The work piece is rigidly held in fixed position by a clamping mechanism or other work holder diagrammatically represented at 127 and supported by a frame 128 of the tool. In its threading position of FIG. 16, the bolt 126 has an initially cylindrical external surface 129 centered about a horizontal axis 130 which is to be the axis of the formed thread 125.

The threading apparatus 131 of FIG. 16 includes four separately formed segmental die elements 132 which are received about the shank of the work piece and which may have the cross-sectional configuration about axis 130 illustrated in FIGS. 17 and 18. Together, these elements 132 form an essentially tubular structure, having an outer cylindrical surface 133, with each of the elements 132 having a thread cutting tooth or projection 144 extending radially inwardly toward axis 130 for engagement with the outer surface of bolt 126. These elements 132 have thread cutting profiles similar to the teeth 36a, 36b, 36c and 36d of FIG. 5, but projecting radially inwardly rather than radially outwardly. Also, in further correspondence with FIG. 5, the cutting edges 132 project radially inwardly different distances, so that as die assembly 134 formed by elements 132 rotates and advances axially, a first of the cutting teeth 132 makes a relatively shallow essentially helical cut in the work piece, with the next successive tooth taking a slightly deeper cut, and the third tooth taking a full cut, and with the fourth cut taking a slightly axially shifted out of phase cut as illustrated in FIG. 8 to give the overall thread configuration shown in FIG. 8. Circularly between the cutting teeth, threading elements 132 are recessed radially outwardly at 135 to receive material cut from the work piece. Adjacent ones of the elements 132 abut axially against one another at planar surfaces 136 extending radially outwardly with respect to axis 130.

Except at the locations of cutting teeth 144, elements 132 have the cross-sectional configuration illustrated in FIG. 18, including the radially outwardly recessed regions 135. This cross-section continues along the entire axial extent of elements 132 from their transverse right end surfaces 137 to their left end surfaces 138, except as that cross-section is interrupted by cutting teeth 144. A rotary drive shaft 139 projects into the interior of assembly 134 of the threading dies from its left end to a transverse end surface 140 offset to the left of the cutting teeth 144. The portion of drive shaft 139 which projects into threading assembly 134 has the non-circular cross-sectional configuration illustrated in FIG. 18, including axially extending ribs 141 which project into the recesses 135 of assembly 134 to key assembly 134 and its elements 132 to part 139 for rotation thereby about axis 130. This cross sectional configuration of part 139 illustrated in FIG. 18 continues leftwardly from end face 140 to a location 142, with shaft 139 having an externally cylindrical surface 143 leftwardly beyond the location 142. This cylindrical portion 143 is journalled within an opening in end wall 145 of frame 128 by a bearing 146 which is illustrated only diagrammatically, and which is of a type to both journal the shaft for rotation and retain it against axial movement relative to the frame. To the left of wall 145, shaft 139 carries a gear 147 which is driven by a second gear 148, which is in turn driven by a digital motor 149 having a reduction gear assembly 150.

The die assembly 134 is contained within a stationary tubular part 151 centered about axis 130 and supported by a rigid stationary wall 152 projecting upwardly from frame 128. Wall 152 contains a cylindrical passage 153 within which part 151 is received, with a ring 154 being threadedly connected to the exterior of part 151 to tightly clamp wall 152 between that nut and a shoulder on part 151, and with a key 155 being received within opposed axial grooves in parts 152 and 151 to effectively lock part 151 in fixed rotary and axial position relative to the frame. Internally, part 151 has an inner cylindrical surface 156 centered about axis 130 and engaging the external cylindrical surfaces 133 of die elements 132 to retain them in centered position relative to axis 130, while permitting rotation and axial movement of the die elements relative to part 151. For effecting controlled axial movement of elements 132 relative to part 151 and the work piece upon rotation of elements 132, each of these elements has a projection 157 extending radially outwardly beyond surface 133 and into the groove of a guide thread 158 formed within part 151 and corresponding to guide thread 35 of FIG. 1. Thread 158 has the same progressive increase in pitch as thread 35 of FIG. 1, and projections 157 are close fits within the groove of thread 158 to prevent unwanted relative axial movement.

In using the tool of FIGS. 16 through 18, an operator first mounts the work piece 126 within holder 127, and energizes motor 149 to rotate shaft 139 through a predetermined number of revolutions sufficient to complete the threading operation. As shaft 139 turns, the interfitting relationship between the external surface of the shaft and the interior of elements 132 causes the assembly 134 formed of the die elements 132 to rotate in correspondence with the turning movement of shaft 139. The projection 157 on each of the elements 132 follows guide thread 158 and is caused by that thread to advance gradually rightwardly during and in timed relation to the rotation of shaft 139. Rotary and axial movements of the die elements 132 are the same as the corresponding movements of elements 30a, 30b, 30c and 30d, in FIG. 1, with resultant formation of a thread of gradually increasing pitch on bolt 126. When the thread cutting teeth on elements 132 reach the end of the area to be threaded on part 126, the rotation of motor 149 is halted, and the motor is power rotated in the opposite direction to unscrew elements 132 from the formed thread.

As in the other forms of the invention, the cutting teeth 144 form progressively deepening cuts in the outer surface of bolt 126, with one or more of the cuts being offset slightly in an axial direction and out of phase relation to give the thread a uniform cross-section and axial thickness through all of its turns while giving the inter-thread groove a progressively widening configuration. Alternatively, in this as in the other forms of the invention, the thread may be formed without giving any of the cutting teeth the discussed out of phase characteristic, so that the increase in pitch appears as an increase in axial width of the formed thread rather than an increase in width of the inter-thread groove. If an out of phase relationship is desired, it may be attained by forming one of the elements 132 to have its cutting tooth 144 and its guide thread following projection 157 closer together than the corresponding teeth and projections of the other elements, as represented by the difference between the dimension x and the dimension y in FIGS. 2 and 3.

In lieu of the single point cutting teeth 36a, 36b, 36c and 36d of FIG. 1, or the corresponding single point cutting teeth of the other forms of the invention, cutters having two points spaced axially apart may be used, as shown in FIGS. 10 and 11 of U.S. Pat. No. 4,842,464, to form the widening groove type of thread as shown in FIG. 8 of the present application. Such an arrangement having cutters with two points is illustrated in FIGS. 19 through 22 of this application. In that two point system, the axial spacing between the cutting portion of each threading element and the projection of that element which follows the guide thread (corresponding to the distance x of FIGS. 1 to 3) may be the same for all elements.

The threading assembly 160 of FIGS. 19 through 22 may be the same as threading assembly 29 of the form of the invention shown in FIGS. 1 through 11, except with respect to the differences specifically discussed below and relating to the use of two cutting projections rather than a single projection on each of the thread forming elements. As in the first form of the invention, FIGS. 19 through 22 typically show four threading elements 161a, 161b, 161c and 161d, corresponding to elements 30a, 30b, 30c and 30d of FIGS. 1 to 11. Also, the rotary drive part, guide thread, work holding structure, and other portions of the mechanism of FIG. 1 and related figures for rotating and axially advancing the threading assembly 160 may be the same as illustrated in FIGS. 1 through 11 and described in the earlier portions of the specification.

Figure 21A:
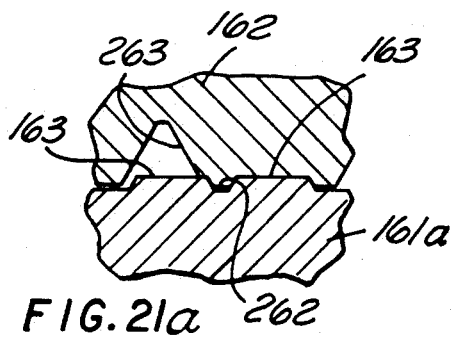
FIGS. 21a, 21b, 21c and 21d are fragmentary sections taken on lines 21a—21a, 21b—21b, 21c—21c and 21d—21d of FIG. 20.
Figure 21B:
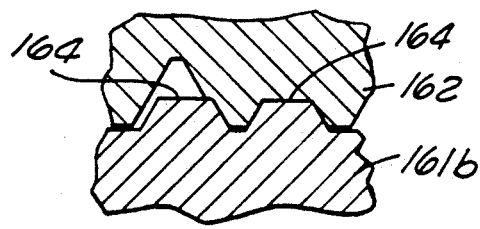
Figure 21C:
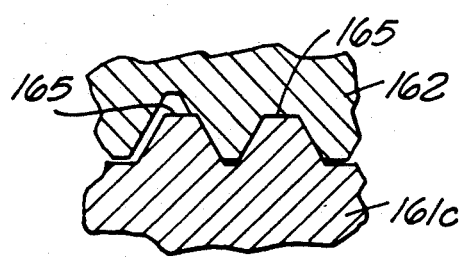
Figure 21D:
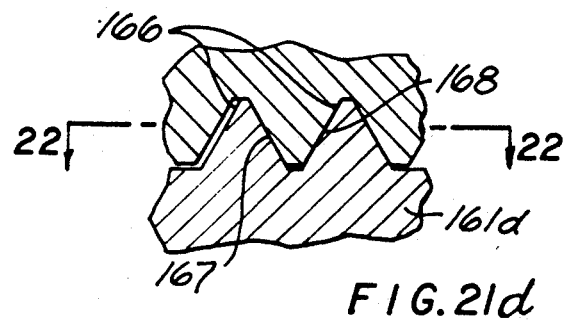

The first threading element to contact the work piece 162 (corresponding to nut body 11 of FIG. 1) during a threading operation is element 161a, which, as seen in FIG. 21a, has two cutting projections 163 extending radially outwardly at axially spaced locations to form two shallow cuts in the work piece. A groove 262 between the two cutting teeth 163 is shaped to form a crest portion of a thread in the work piece. The next successive threading element 161b to contact the work piece has two projections 164 (see FIG. 21b) extending radially outwardly farther than projections 163 to deepen the thread formed in the work piece. Similarly, as seen in FIG. 21c, the third threading element 161c has two thread cutting projections 165 spaced axially apart and projecting radially outwardly farther than the projections 164, to further deepen the thread formed in work piece 152. The fourth threading element 161d, as seen in FIG. 21b, has thread cutting projections 166 which are spaced axially apart and which project radially outwardly through the full final depth of the thread being produced, to simultaneously form the opposite flank surfaces 167 and 168 of a full depth conventional sixty degree thread formed in the work piece.

The leading one of the two thread cutting projections of each element 161a, 161b, 161c or 161d contacts any particular portion of the work piece one full turn in advance of the trailing thread cutting projection of the same element. As a result, all four of the leading projections of the four elements 161a, 161b, etc. make their cuts in the work piece, to form a full depth thread groove in the work piece (see the groove 263 in FIG. 21a), before the first of the trailing projections (the left hand projection 163 in FIG. 21a) commences its cut. The eight thread cutting projections make their cuts sequentially, with the first cut at a particular point in the work piece being made by the leading one (right hand one) of the two projections 163, after which the leading projection 164 makes a deeper cut, followed in order by the leading projections 165 and 166 and then the trailing projections 163, 164, 165 and 166. The trailing projections widen the groove 263 formed by the leading projections so that the thread formed in the work piece is of uniform axial cross section and axial thickness while the inter-thread groove in the work piece increases progressively in width as the pitch of the formed thread increases.

As in the first form of the invention, each of the elements 161a, 161b, 161c and 161d has a projection 169 at its left end corresponding to projection 34 of FIG. 1, and which fits into guide thread 170 corresponding to thread 35 of FIG. 1, to control the axial advancement of the threading elements 161a, 161b, etc., and give the formed thread 169 the same progressively increasing pitch as is provided in guide thread 170. In order to cause the two thread cutting projections of each of the threading elements 161a, 161b, etc. to follow the same generally helical increasing pitch path as the two projections of each of the other threading elements, the axial distances between the guide thread following projections and the cutting projections should be the same for all four threading elements. For example, in FIG. 19, the axial distance t between the guide thread following projection 169 of element 161b and the center of the thread forming groove 262 between the two projections 164 of element 161b is the same as the corresponding distance for each of the other elements 161c, 161d, and 161a.

Figure 22:
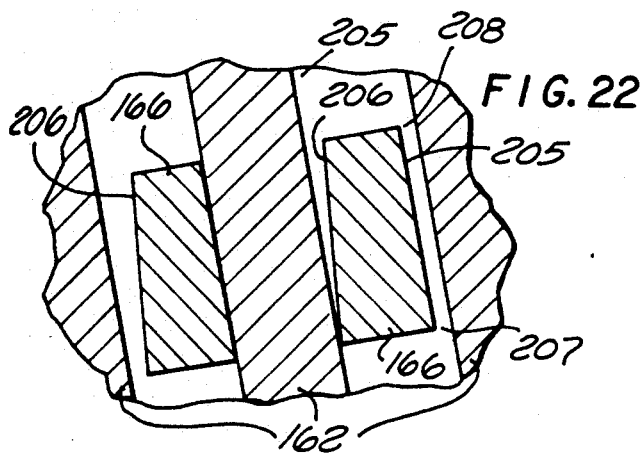
FIG. 22 is a section taken on line 22—22 of FIG. 21d.

As represented in FIG. 22, each of the two cutting projections 163, 164, 165 or 166 of each element 161a, 161b, 161c or 161d is shaped so that right side surface 205 and left side surface 206 gradually converge from their leading ends 207 to their trailing ends 208. The cross sections illustrated in FIGS. 21a, 21b, 21c and 21d are at the leading ends of the cutting projections (as discussed in connection with FIG. 11). Surfaces 205 are machined on a lathe or other similar tool to a pitch corresponding to the maximum pitch of the thread being formed in the work piece, and surfaces 206 are machined by a lathe or the like to a pitch corresponding to the minimum pitch of the thread being formed in the work piece.

Figure 23A:
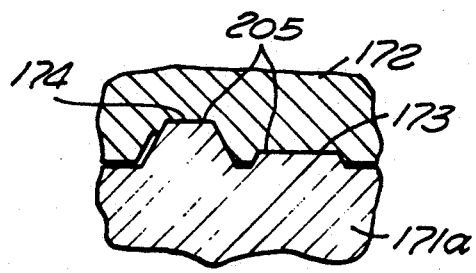
FIGS. 23a, 23b, 23c and 23d are views corresponding to FIGS. 21a, 21b, 21c and 21d, respectively, but showing a different arrangement of cutting edges.

FIGS. 23a, 23b, 23c and 23d show a cutter arrangement including four thread forming elements 171a, 171b, 171c and 171d which are very similar to elements 161a, 161b, 161c and 161d of FIGS. 22a, b, c and d except that the cutting edges are shaped differently in FIGS. 23a, b, c and d to make more gradual cuts in the work piece 172. More specifically, it is noted that the two thread cutting projections 173 and 174 on the first element 171a to contact the work piece during a threading operation are formed at different radial heights. The right hand projection 173 has a relatively small radial dimension, to form an initial very shallow cut in the work piece, while projection 174 has a substantially greater radial dimension to form a much deeper cut. Similarly, the leading projection 175 of element 171b is shallower than the trailing projection 176 of that element, and the leading projection 177 of element 171c has a smaller radial dimension than the trailing projection 178 of that element. The cut formed by projection 175 is slightly deeper than the cut formed by projection 173, and the cut formed by projection 177 is slightly deeper than the cut formed by projection 175. The cut formed by projection 174 is slightly deeper than the cut formed by projection 177, the cut formed by projection 176 is slightly deeper than the cut formed by projection 174, and the cut formed by projection 178 is slightly deeper than the cut formed by projection 176. The two projections 179 and 180 of the fourth cutting element 171d both project radially outwardly slightly farther than projection 178, and have the full thread cross section to simultaneously form the opposite side surfaces of the intermediate thread 181 and thus complete production of the desired sixty degree thread. During rotary and axial advancement of the threading assembly of FIGS. 22a, b, c and d through a work piece, any particular portion of the work piece will first be contacted by projection 173, then projection 175, then projection 177, then projection 174, then projection 176, then projection 178, and finally by projections 179 and 180 to finish the thread.

The two cutting projections 175 and 176 of element 171b trail ninety degrees circularly behind the two projections 173 and 174 respectively of element 171a. The two cutting projections 177 and 178 of element 171c trail ninety degrees circularly behind the two projections 175 and 176 respectively of element 171b. In the case of element 171b, however, it is preferable that the cutting projections of this element trail farther behind the projections of element 171c, in order to enable completion of all of the cuts made by the first three elements before the two final cuts are made by element 171d. For this purpose, cutting projection 179 of element 171d should trail one full turn of the thread being formed plus ninety degrees behind projection 177, and should trail ninety degrees behind projection 178. This arrangement is represented in FIG. 24, in which it will be apparent that the projections 179 and 180 are offset leftwardly more than a full turn with respect to projections 177 and 178.

Figure 24:
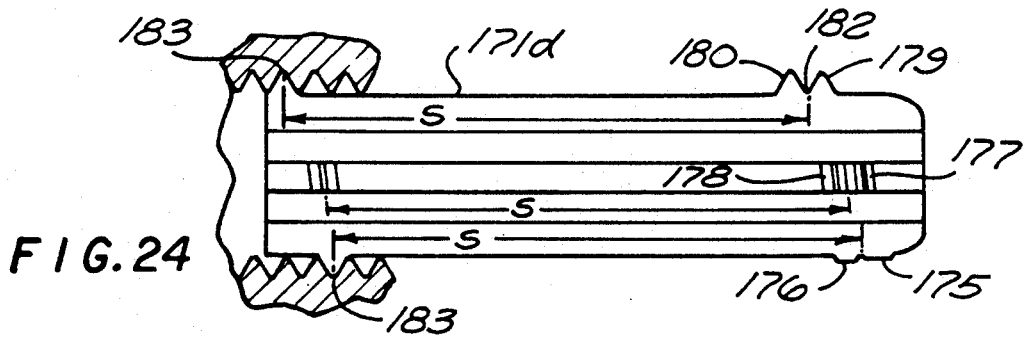
FIG. 24 is a view similar to FIG. 19 of a threading assembly having cutting edges as shown in FIGS. 23a, 23b, 23c and 23d.

In FIG. 24, the axial distance between the center of groove 182 which forms the thread in the work piece and the projection 183 which follows the guide thread is represented at s. That distance s is the same for all four of the elements 171a, 171b, 171c and 171d, even though the projections of element 171d are offset leftwardly as discussed above.

Figure 27:
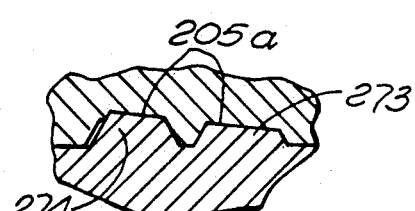
FIG. 27 is a view similar to FIG. 23a, representing fragmentarily a variation of the arrangement of FIGS. 23a, 23b, 23c and 23d.
Figure 23B:
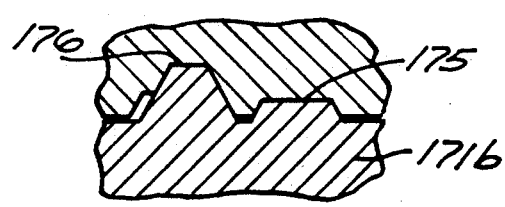
Figure 23C:
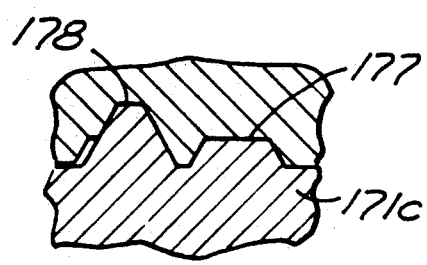
Figure 23D:
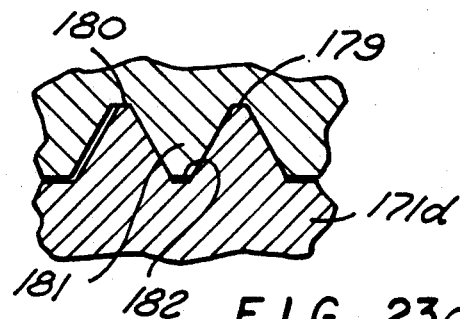

The radially outer surfaces 205 of the various cutting projections 173 through 178 of FIGS. 23a, 23b and 23c are typically illustrated as extending directly parallel to the main axis of the threading assembly (axis 19 of FIG. 1). In some cases, it is preferable that those outer surfaces of the cutting projections, instead of being disposed axially, taper conically about the axis of the assembly, as represented at 205a in FIG. 27. In that case, all of the projections identified by the numbers 173, 174, 175, 176, 177 and 178 in FIGS. 23a, 23b and 23c may have their outer surfaces disposed in the same conical pattern as surfaces 205a of projections 273 and 274 in FIG. 27, with the leading cutter on each threading element being smaller than the trailing cutter, and with the projections of the different threading elements progressively increasing in maximum radial dimension in the sequence 173, 175, 177, 174, 176 and 178 as in FIGS. 23a, 23b and 23c.

Figure 26:
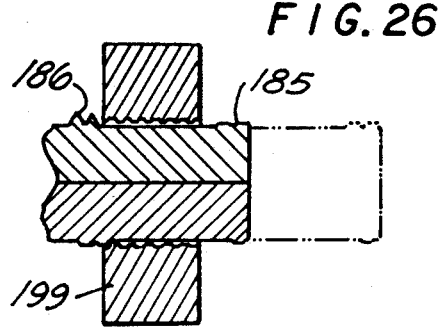
FIG. 26 shows the cutting assembly of FIG. 25 in a second position.
Figure 25:
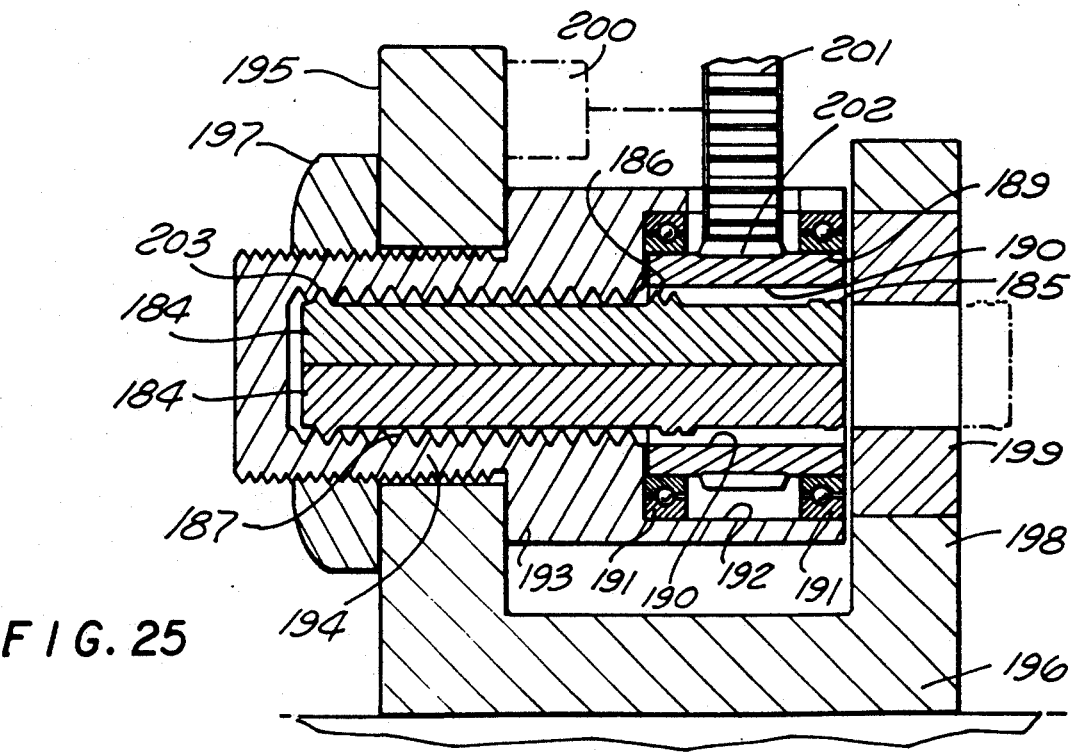
FIG. 25 shows an arrangement in which the thread forming elements have two sets of thread cutting projections spaced axially apart.

FIGS. 25 and 26 show a form of the invention in which four threading elements 184 may be essentially the same as elements 30a, 30b, 30c and 30d of FIGS. 1 to 11 except with respect to their thread forming projections 185 and 186 and the rate of advancement of the elements by guide thread 187. The rotary drive part 189 of FIG. 25 has an internal cross section corresponding to that shown in FIG. 6 to drive elements 184 rotatively, and has four circularly spaced grooves 190 corresponding to grooves 131 of FIG. 6 and within which cutting projections 185 and 186 are receivable. Drive part 189 is externally cylindrical and located for rotation within two bearings 191 contained within a bore 192 in a part 193 whose reduced diameter portion 194 extends through an opening in an upstanding wall 195 of a frame part 196. A nut 197 connected threadedly onto portion 194 of part 193 secures that part rigidly to wall 195. A second upstanding wall 198 of the frame is adapted to receive and removably hold the nut body 199 within which a thread of progressively increasing pitch is to be formed. A motor diagrammatically represented at 200 and typically mounted to frame 196 drives a gear 201 which engages gear teeth 202 on the exterior of drive ring 189 to turn that ring in a first direction for advancing the threading assembly through nut body 199 and in an opposite direction for retracting the assembly.

Prior to a threading operation, the assembly consisting of elements 184 is in its retracted position illustrated in FIG. 25, in which both sets of cutting projections 185 and 186 are retracted into drive part 189 as shown. When motor 200 commences rotation of drive part 189 in an advancing direction, that rotation is transmitted to elements 184 in the same manner discussed in connection with ring 31 of the first form of the invention, to simultaneously rotate and axially advance cutting projections 185 and 186. The projections 185 and 186 may be single point projections such as those shown at 36a, 36b, 36c and 36d in the first form of the invention, or may include two projections 185 and two projections 186 on each of the elements 184 in correspondence with the showing of FIGS. 19 through 22 or FIGS. 23 and 24, or may have any of various other configurations. FIGS. 25 and 26 typically illustrate double projections of the type shown in FIGS. 19 to 22.

As the first set of cutting projections 185 advance through work piece 199, guide thread 187 acts by its progressive increase in pitch to form a thread of corresponding increase in pitch in the work piece. The first set of projections 185 are of increasing depth in a manner similar to that shown in FIGS. 21a through 21d, but are shallower radially than in those Figures, so that after the projections 185 of all of the elements 184 have advanced through the work piece the thread formed in the work piece is only of partial depth, say one-half of the desired final radial depth. The second set of thread forming projections 186 on the thread forming elements are spaced axially from the first set of projections 185 far enough to enable the first projections 185 to reach the position illustrated in FIG. 26 entirely beyond work piece 199 before the second set of projections 186 contact and commence their cutting action in the work piece. The projections of this second set 186 have greater radial extent than projections 185, to progressively increase the depth of cut until the final full thread is attained. FIG. 26 illustrates in broken lines the position of the cutting elements after the second set of projections 186 have advanced through and made their cuts in the work piece 199.

In order to enable the second set of projections 186 to follow the same generally helical path through the work piece as the first set of projections 185, guide thread 187 is shaped to move the threading elements 184 through exactly the same cycle of advancement while projections 186 are in contact with the work piece as when projections 185 are in contact with the work piece. To discuss this in somewhat greater detail, when the leading cutting projection 185 of the first of the elements 184 initially contacts the work piece during a threading operation, the projection 203 of that element which contacts the guide thread 187 is in engagement with a portion of the guide thread having a predetermined effective pitch. That pitch gradually increases during rightward and rotary movement of the assembly, to give the formed thread a corresponding increasing pitch. The other projections 185 of the other thread forming elements follow a similar cycle of increasing pitch to make progressively deepening cuts in the work piece. After the two projections 185 of a particular element 184 have moved beyond the work piece as represented in full lines in FIG. 26, the portion of guide thread 187 which is then contacted by projection 203 of that element 184 starts to decrease in pitch, to slow the advancement of the element, after which the thread 187 again commences to gradually increase in pitch, at a rate causing the projections 186 of that element 184, upon initial contact with the work piece, to be advanced by the guide thread at exactly the same lead angle as were the projections 185 of the same element 184 when they were at the same location. Also, during further advancement rightwardly of each element 184 while in contact with the work piece, that element and its cutting projections 186 are advanced by guide thread 187 through exactly the same increasing pitch cycle as were projections 185 of the same element 184 during their cutting operation, to perform a similar but progressively deepening cutting action therein. Stated differently, the guide thread has a repeating pattern, with two portions of identical increasing pitch configuration. The portion of the guide thread which is contacted by follower projection 203 of each element 184 while projections 185 of that element are performing a threading operation in work piece 199 increases in pitch through exactly the same cycle of pitch values as does the portion of the guide thread which is contacted by projection 203 while the second projections 186 are performing their threading operation in work piece 199.

After the second cutting operation has been completed by advancement of projections 186 through and beyond the work piece, the rotation of motor 200 and drive element 189 is reversed to retract elements 184 back through the nut body and to the FIG. 25 condition, after which the nut body 199 can be removed and another work piece be inserted in the frame for a next successive threading operation. The various cutting elements 186 and 185 follow the same generally helical paths of varying pitch during retraction through the nut body, to unscrew the assembly from the nut body without damaging the formed thread. Any of the features of the cutting projections of the various forms of the invention shown in FIGS. 1 through 24 can of course be applied to the two sets of projections 185 and 186 of FIGS. 25 and 26.

While certain specific embodiments of the present invention have been disclosed as typical, the invention is not limited to these particular forms, but rather is applicable broadly to all such variations as fall within the scope of the appended claims.

I claim:

1. Apparatus for forming a thread of varying pitch on a work piece, comprising:

an assembly including a plurality of threading elements having thread forming portions on said elements for engaging the work piece at different locations; and means for moving said work piece and said assembly of threading elements relative to one another, both rotatively about an axis and at the same time axially, to form the thread;

said means being constructed to vary the rate of relative axial advancement between said work piece and each of said elements per degree of relative rotary movement therebetween, and to shift said elements axially relative to one another, during the rotary and axial movement, to give the thread said varying pitch.

2. Apparatus as recited in claim 1, in which said elements are positioned to retain each other against transverse relative movement from predetermined relative positions in said assembly.

3. Apparatus as recited in claim 1, in which said thread forming portions of said elements face generally radially outwardly away from said axis to form said thread as an internal thread in the work piece.

4. Apparatus as recited in claim 3, in which said elements have radially outer surfaces circularly between said thread forming portions which are recessed away from the work piece.

5. Apparatus as recited in claim 1, in which adjacent ones of said elements have axially extending side surfaces which slidably engage one another and retain adjacent elements against relative movement about said axis, and against movement radially inwardly toward said axis and away from the work piece.

6. Apparatus as recited in claim 1, in which said means include a rotary drive for rotating said elements about said axis, and means for moving said elements axially relative to the work piece and relative to one another in timed relation to the rotation of said elements.

7. Apparatus as recited in claim 1, in which said means include a rotary drive engaging surfaces on said elements which are non-circular and acting to rotate the elements about said axis, and means for moving said elements axially relative to said work piece and relative to one another in timed relation to the rotation of said elements.

8. Apparatus as recited in claim 1, in which said means include a rotary drive engaging surfaces on said elements which are non-circular and acting to rotate the elements about said axis, and a guide thread of varying pitch engaged by said elements and acting to move said elements axially relative to said work piece and relative to one another in times relation to the rotation of said elements.

9. Apparatus as recited in claim 1, in which said means include a guide thread of varying pitch, and means for producing relative rotation between said guide thread and said elements, with said guide thread acting on said elements to move them axially relative to one another and relative to the work piece in timed relation to the relative rotation of the guide thread and elements.

10. Apparatus as recited in claim 1, in which said means include means for rotating said threading elements as an assembly about said axis, and a non-rotating guide thread of varying pitch engaged at different locations by said elements and acting to shift said elements axially relative to the guide thread and relative to one another and the work piece in timed relation to the rotation of said elements relative to the guide thread.

11. Apparatus as recited in claim 1, in which said thread forming portions of said elements face generally radially outwardly away from said axis to form said thread as an internal thread in the work piece, said elements as viewed in transverse section forming essentially segments of a circle and tapering to reduced circular dimensions as they extend radially inwardly toward said axis, with adjacent elements having axially extending side surfaces which slidably engage one another so that said elements retain each other against movement radially inwardly toward said axis and also retain each other against movement about said axis relative to one another, said elements having surfaces between said thread forming portions which are relieved radially inwardly away from said work piece.

12. Apparatus as recited in claim 11, in which said means include a rotary drive for rotating said elements about said axis, and a non-rotating guide thread engaged by said elements at different locations and acting to move said elements axially relative to the guide thread and relative to one another and the work piece upon rotation of the elements.

13. Apparatus as recited in claim 12, in which said rotary drive includes a part driven rotatively and disposed about said elements and engaging said relieved surfaces of the elements to drive the elements rotatively while permitting axial movement thereof.

14. Apparatus as recited in claim 13, in which each element has a projection engaging said guide thread and actuated thereby, there being a greater distance axially between said thread forming portion and said projection for a first of said elements than for a second of said elements to actuate said first and second elements in a predetermined relationship giving the thread formed in said work piece a uniform axial sectional configuration and uniform axial width.

15. Apparatus as recited in claim 1, in which said means include a guide thread of varying pitch, said means being constructed to produce relative rotation between the guide thread and said elements upon relative rotation of the elements and work piece, each element having a projection engaging said guide thread to shift the element axially upon relative rotation of the elements and guide thread, there being a greater distance axially between said thread forming portion and said projection for a first of said elements than for a second of said elements.

16. Apparatus as recited in claim 1, in which said means include a guide thread of varying pitch, means for producing relative rotation between said guide thread and said elements, and projections on said elements engaging said guide thread to cause axial movement of the elements relative to the guide thread in response to relative rotation between the guide thread and elements, said projections having conically curving surfaces at opposite axial sides thereof for engaging two opposed flank surfaces of the varying pitch guide thread at different locations therealong.

17. Apparatus as recited in claim 16, in which said projections have portions of triangular cross section ahead of and behind said conically curving surfaces.

18. Apparatus as recited in claim 1, in which said thread forming portions of the threading elements have cutting edges at leading ends thereof, and said thread forming portions taper to progressively smaller axial widths behind said cutting edges.

19. Apparatus as recited in claim 18, in which said tapering thread forming portions of the threading elements have opposite side surfaces behind said cutting edges, one of which has a lead angle at least as great as the maximum lead angle of said thread formed in the work piece, and the other of which has a lead angle at least as small as the minimum lead angle of said thread formed in the work piece.

20. Apparatus as recited in claim 1, including a second assembly of relatively axially movable threading elements corresponding to said first mentioned assembly, and means for relatively moving said work piece and said second assembly rotatively and axially, with relative axial shifting movement of the elements, to increase the depth of the thread of varying pitch formed by said first mentioned assembly.

21. Apparatus as recited in claim 1, in which there are two of said assemblies of relatively axially movable threading elements aligned axially with one another at opposite axial sides of said work piece, said means being constructed to successively actuate said two assemblies axially and rotatively into said work piece from said opposite sides thereof, with a first of the assemblies forming a variable pitch thread of partial depth and the second assembly forming a deeper variable pitch thread.

22. Apparatus as recited in claim 1, in which said means include individual motors for actuating said different threading elements respectively axially of the work piece, and means for actuating said motors in timed relation to the relative rotary movement between the elements and work piece.

23. Apparatus as recited in claim 1, in which said threading elements are die elements receivable at different locations about the work piece with said thread forming portions projecting radially inwardly to form an external thread on the work piece.

24. Apparatus as recited in claim 23, in which said means include a rotary drive part projecting into the interior of said die elements and acting to turn them about said axis.

25. Apparatus as recited in claim 23, including a guide thread of varying pitch engaged by said die elements for shifting them axially upon relative rotation of the guide thread and elements.

26. Apparatus as recited in claim 1, in which said elements are die elements forming together a tubular structure having said thread forming portions projecting radially inwardly to form an external thread on the work piece, said means including a rotary drive part projecting into said die elements and interfitting therewith to turn the die elements about said axis, and a stationary tubular part disposed about said die elements and containing an internal guide thread of varying pitch engaged by the die elements to shift them axially relative to the work piece and relative to one another in timed relation to the rotation of the die elements.

27. Apparatus as recited in claim 1, in which said means include a first motor for rotating said work piece about said axis, a plurality of additional motors operable to move said threading elements respectively axially relative to the work piece and relative to one another, and control means for actuating said first motor and said additional motors in timed relation to advance the elements axially relative to the work piece and relative to one another as the work piece turns to form said thread of varying pitch in the work piece.

28. Apparatus as recited in claim 1, in which said thread forming portions of individual ones of said elements include two thread forming projections on the same element spaced axially apart to simultaneously form opposite sides of a turn of said thread.

29. Apparatus as recited in claim 28, in which said thread forming projections of the elements have different cross sectional areas to progressively deepen grooves at opposite sides of said thread as different elements successively contact a particular portion of the work piece.

30. Apparatus as recited in claim 1, in which said thread forming portions of said elements include two thread forming projections on each of said elements spaced axially apart to simultaneously form opposite sides of a turn of said thread with the projections of successive elements being of increasing radial extent to form progressively deeper thread grooves on the work piece.

31. Apparatus as recited in claim 1, in which said thread forming portions of individual ones of said elements include two thread forming projections on the same element which are spaced axially apart to simultaneously form opposite sides of the thread and which are of different radial depths.

32. Apparatus as recited in claim 1, in which said thread forming portions include two thread forming projections on each of a series of said elements for forming opposite sides of the thread, with a first projection on each element being shorter radially than the second, and with the two projections of successive elements becoming progressively deeper radially.

33. Apparatus as recited in claim 32, in which said thread forming portions of a final one of said elements include two projections of the same full thread radial depth.

34. Apparatus as recited in claim 1, in which said thread forming portions of said elements include first and second thread forming portions on a particular element for performing successive threading operations and which are spaced axially apart in a relation causing said first portion to complete its threading operation on the work piece and advance beyond the work piece before said second portion of the same element commences its threading operation.

35. Apparatus as recited in claim 34, in which said means are constructed to control the rate of relative axial advancement between said work piece and said elements so that said second thread forming portion of a particular element and said work piece follow the same cycle of relative advancement while said second portion is performing its threading operation as do said first portion of the same element and the work piece when the first portion is performing its threading operation.

36. Apparatus as recited in claim 35, in which said first and second thread forming portions of a particular element each include two projections for simultaneously engaging and shaping opposite side surfaces of a turn of said thread.

37. Apparatus as recited in claim 34, in which said first and second thread forming portions of a particular element each include two projections for simultaneously engaging and shaping opposite side surfaces of a turn of said thread.

38. Apparatus as recited in claim 1, in which said means include a rotary drive for rotating said elements about said axis, and axial advancement means for moving said elements axially relative to the work piece and relative to one another in timed relation to the rotation of said elements, said thread forming portions of said elements including first and second thread forming portions on a particular element for performing successive threading operations and which are spaced axially apart in a relation causing said first portion to complete its threading operation and advance beyond the work piece before said second portion of the same element commences its threading operation, said axial advancement means being constructed to control the rate of relative axial advancement between said work piece and said elements so that said second thread forming portion of a particular element and said work piece follow the same cycle of relative advancement while said second portion is performing its threading operation as do said first portion of the same element and the work piece when the first portion is performing its threading operation.

39. Apparatus as recited in claim 38, in which said first and second thread forming portions of a particular element each include two projections for simultaneously engaging and shaping opposite side surfaces of a turn of said thread.

40. Apparatus as recited in claim 1, in which said means include a guide thread of varying pitch, and means for producing relative rotation between said guide thread and said elements, with said guide thread acting on said elements to move them axially relative to one another and relative to the work piece in timed relation to the relative rotation of the guide thread and elements, said thread forming portions of said elements including first and second thread forming portions on a particular element for performing successive threading operations and which are spaced axially apart in a relation causing said first portion to complete its threading operation and advance beyond the work piece before said second portion of the same element commences its threading operation, said guide thread having two portions of similarly varying pitch for controlling advancement when said first and second thread forming portions of a particular element are performing their threading operations so that said second thread forming portion of a particular element and said work piece follow the same cycle of relative advancement while said second portion is performing its threading operation as do said first portion of the same element and the work piece when the first portion is performing its threading operation.

41. Apparatus for forming a thread of varying pitch on a work piece, comprising:
an assembly including a plurality of threading elements having thread forming portions on said elements for engaging the work piece at different locations; and
means for moving said work piece and said assembly of threading elements relative to one another, both rotatively about an axis and at the same time axially, to form the thread;
said means being constructed to shift said elements axially relative to one another during said rotary and axial movement.

42. The method of forming a thread of varying pitch on a work piece, comprising:
moving said work piece and an assembly of threading elements having thread forming portions relative to one another both rotatively about an axis and at the same time axially, to form the thread; and
varying the rate of relative axial advancement between said work piece and each of said elements per degree of relative rotary movement therebetween, and shifting said elements axially relative to one another during the rotary and axial movement, to give the thread said varying pitch.

43. The method as recited in claim 42, in which said thread forming portions of the elements face radially outwardly away from said axis to form said thread as an internal thread.

44. The method as recited in claim 42, in which in any particular position of the elements during said relative rotary and axial movement of the work piece and elements, different ones of said elements are advancing axially relative to the work piece at different rates, in a relationship producing said thread of varying pitch.

45. The method as recited in claim 44, in which one of said thread forming portions of one element, when forming one side of the thread at any particular location, is advancing axially relative to the work piece at the same rate per degree of relative rotary movement as does the thread forming portion of a second of the elements when forming the opposite side of the thread at the same location.

46. The method as recited in claim 42, in which said thread forming portions of individual ones of said elements include two thread forming projections on the same element which simultaneously form opposite sides of a turn of said thread.

47. The method as recited in claim 42, in which said thread forming portions of individual ones of said elements include two thread forming projections on the same element which simultaneously form opposite sides of a turn of said thread and are of different radial depths.

48. The method as recited in claim 42, in which said thread forming portions of said elements include first and second thread forming portions on a particular element for performing successive threading operations, said method including completing the threading operation on the work piece by said first portion and advancing said first portion beyond the work piece before said second portion of the same element commences its threading operation.

49. The method as recited in claim 48, including controlling the rate of relative axial advancement between said work piece and said elements so that said second thread forming portion of a particular element and said work piece follow the same cycle of relative advancement while said second portion is performing its threading operation as do said first portion of the same element and the work piece when the first portion is performing its threading operation.

50. A threading tool for forming a thread of varying pitch on a work piece, comprising:
an assembly including a plurality of threading elements having thread forming portions on said elements for engaging the work piece at different locations;

said assembly being adapted to form said thread by relative movement of said work piece and said assembly of threading elements both rotatively about an axis and at the same time axially;

said elements being movable axially relative to one another during the rotary and axial movement, to give the thread said varying pitch.

51. A threading tool as recited in claim 50, in which said elements are positioned to retain each other against relative movement transversely of said axis from predetermined relative positions in said assembly.

52. A threading tool as recited in claim 50, in which said elements, as viewed in cross section transversely of said axis, taper to reduced circular dimensions as they extend radially inwardly toward said axis, with adjacent elements having axially extending side surfaces which slidably engage one another so that said elements retain each other against movement radially inwardly toward said axis and also retain each other against movement about said axis relative to one another.

53. A threading tool as recited in claim 52, in which said elements have radially outer surfaces between said thread forming portions which are relieved away from the work piece to receive material removed from the work piece.

54. A threading tool as recited in claim 50, including a rotary drive part for turning said elements about said axis, with the elements being shiftable axially relative thereto.

55. A threading tool as recited in claim 50, including a guide thread of varying pitch acting to move said elements axially relative to one another in response to relative rotation between the guide thread and said elements.

56. A threading tool as recited in claim 55, in which each element has a projection engaging and following said guide thread for movement axially thereby, there being a greater distance axially between said thread forming portion and said projection for a first of said elements than for a second of said elements.

57. A threading tool as recited in claim 50, including a rotary drive part disposed about said assembly of threading elements, and a guide thread of varying pitch acting to move said elements axially in response to relative rotation between the guide thread and said elements.

58. A threading tool as recited in claim 57, in which each element has a projection engaging and following said guide thread for movement axially thereby, there being a greater distance axially between said thread forming portion and said projection for a first of said elements than for a second of said elements.

59. A threading tool as recited in claim 50, in which said thread forming portions of individual ones of said elements include two thread forming projections on the same element spaced axially apart to simultaneously form opposite sides of a turn of said thread.

60. A threading tool as recited in claim 50, in which said thread forming portions include two thread forming projections on each of a series of said elements for forming opposite sides of the thread, with a first projection on each element being shorter radially than the second, and with the two projections of successive elements becoming progressively deeper radially.

61. A threading tool as recited in claim 50, in which said thread forming portions of said elements include first and second thread forming portions on a particular element for performing successive threading operations and which are spaced axially apart in a relation causing said first portion to complete its threading operation on the work piece and advance beyond the work piece before said second portion of the same element commences its threading operation.

* * * * *